US012380369B1

(12) United States Patent
Joshi et al.

(10) Patent No.: US 12,380,369 B1
(45) Date of Patent: Aug. 5, 2025

(54) HYPERPARAMETER TUNING IN AUTOREGRESSIVE INTEGRATED MOVING AVERAGE (ARIMA) MODELS

(71) Applicant: SAS Institute Inc., Cary, NC (US)

(72) Inventors: Mahesh Vijaykumar Joshi, Cary, NC (US); Sounak Paul, Raleigh, NC (US); Iman Vasheghani Farahani, Charlotte, NC (US); Youngjin Park, Seoul (KR)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/984,272

(22) Filed: Dec. 17, 2024

Related U.S. Application Data

(60) Provisional application No. 63/644,764, filed on May 9, 2024.

(51) Int. Cl.
*G06N 20/00* (2019.01)

(52) U.S. Cl.
CPC ................... *G06N 20/00* (2019.01)

(58) Field of Classification Search
CPC ....... G06F 11/3452; G06N 5/01; G06N 20/00
See application file for complete search history.

(56) References Cited

U.S. PATENT DOCUMENTS

| 10,360,517 B2 | 7/2019 | Koch et al. | |
| 2018/0240041 A1* | 8/2018 | Koch | G06N 3/126 |
| 2023/0153394 A1* | 5/2023 | Ahuja | G06F 18/10 |
| | | | 706/12 |
| 2023/0259813 A1* | 8/2023 | Chang | G06N 3/09 |
| | | | 706/12 |
| 2024/0273400 A1* | 8/2024 | Boué | G06N 3/0985 |

OTHER PUBLICATIONS

Lee, Application of Subset Autoregressive Integrated Moving Average Model for Short-Term Freeway Traffic Volume Forecasting (Year: 1999).*

Peng, et al., "Improved Genetic Algorithm and Application to ARMA Modelling," SIC Annual Conference in Fukui, Aug. 4-6, 2023, pp. 134-139.

(Continued)

*Primary Examiner* — Abdullah Al Kawsar
*Assistant Examiner* — Tewodros E Mengistu
(74) *Attorney, Agent, or Firm* — Bell & Manning, LLC

(57) ABSTRACT

A system and method include tuning hyperparameters for an ARIMA model using a derivative free approach by determining a set of initial hyperparameter values, fitting an ARIMA model to the set of initial hyperparameter values, selecting a tuning method for the set of hyperparameters, responsive to selecting a single-objective method, computing a first objective function value from time-series data applied to the ARIMA model based on the set of initial hyperparameter values, or responsive to selecting a multi-objective method, computing at least a second objective function value and a third objective function value from the time-series data applied to the ARIMA model based on the set of initial hyperparameter values, determining whether a stopping criterion for tuning the set of hyperparameters has reached, responsive to determining that the stopping criteria has reached, outputting a set of tuned hyperparameter values.

30 Claims, 22 Drawing Sheets

(56) References Cited

OTHER PUBLICATIONS

SAS® Help Center, Time Series Packages, Forecasting Details, May 2024, 1 page.

Zulariffin, et al., "Optimization of SARIMA Model Using Genetic Algorithm Method in Forecasting Singapore Tourist Arrivals to Malaysia," Applied Mathematical Science, 2014, pp. 8481-8491, vol. 8, No. 170.

Ong, et al., "Model Identification of ARIMA Family Using Genetic Algorithms," Applied Mathematics and Computation, 2005, pp. 885-912, vol. 164, doi:10.1016/j.amc.2004.06.044.

Reilly, David Patrick, "The Autobox System," International Journal of Forecasting, 2000, pp. 531-533, vol. 16, No. 4.

Rolf, et al., "Model identification and parameter estimation of ARMA models by means of evolutionary algorithms," Comput. Intell. Financial Eng., 1997, pp. 237-243, vol. 23.

Stadnytska, et al., "Comparison of Automated Procedures for ARMA Model Identification," Behavior Research Models, 2008, pp. 250-262, vol. 40.

Taddy, et al., "Bayesian guided pattern search for robust local optimization," Technometrics, 2009, pp. 389-401, vol. 51, No. 4, 2009, https://doi.org/10.1198/TECH.2009.08007.

Makridakis, et al., "The M3-Competition: results, conclusions and implications," International Journal of Forecasting, 2000, pp. 451-476, vol. 16, No. 4.

Chiogna, et al., "Automatic identification of seasonal transfer function models by means of iterative stepwise and genetic algorithms," Journal of Time Series Analysis, 2007, pp. 37-50, , vol. 29, Issue 1.

Choi, ByoungSeon, "ARMA model identification," 1992, 10 pages.

Deif, et al., "Arima model estima- tion based on genetic algorithm for covid-19 mortality rates," International Journal of Information Technology and Decision Making, 2021, pp. 1775-1798, vol. 20, No. 06.

Ervural, et al., "Model estimation of arma using genetic algorithms: A case study of forecasting natural gas consumption," Procedia-Social and Behavioral Sciences, 2016, pp. 537-545, vol. 235.

Gaetan, Carlo, "Subset ARMA Model Identification Using Genetic Algorithms," J. Time Series Anal., 2000, pp. 559-570, vol. 21.

Gardner, et al., "Constrained Multi-Objective Optimization for Automated Machine Learning," IEEE International Conference on Data Science and Advanced Analytics (DSAA), 2019, pp. 364-373.

Abo-Hammour, et al., "ARMA model order and parameter estimation using genetic algorithms," Mathematical and Computer Modelling of Dynamical Systems, 2012, pp. 201-221, vol. 8, No. 2.

Box, et al., "An analysis of transformations," Journal of the Royal Statistical Society. Series B (Methodological), 1964, pp. 211-252, vol. 26, No. 2.

Box, et al., Time-Series Analysis: Forecasting and Control. Holden-Day, 976, 10 pages.

Brockwell, et al., "Time Series: Theory and Methods," 1991, 14 pages.

Goldberg, D.E., "Genetic Algorithms in Search, Optimization and Machine Learning," Addison-Wesley Longman Publishing Co., Inc., 1989, 7 pages.

SAS Institute Inc., SAS® Visual Forecasting: Time Series Packages, 2023, 738 pages.

Goodrich, Robert L., The Forecast Pro Methodology. International Journal of Forecasting, 2000, pp. 533-535, vol. 16.

Koch, et al., "A Derivative-Free Optimization Framework for Hyperparameter Tuning," Proceedings of the 24th ACM SIGKDD International Conference on Knowledge Discovery and Data Mining, 2018, 10 pages.

Gray, et al., "Hybrid Optimization Schemes for Simulation-Based Problems," Procedia Computer Science, 2010, pp. 1349-1357, vol. 1, No. 1.

Tsay, et al., "Consistent Estimates of Autoregressive Parameters and Extended Sample Autocorrelation Function for Stationary and Nonstationary ARMA Models," Journal of the American Statistical Association, 1984, pp. 84-96, vol. 79, No. 385.

Griffin, et al., "Derivative-Free Optimization Via Evolutionary Algorithms Guiding Local Search (EAGLS) for MINLP," Pacific Journal of Optimization, 2011, pp. 425-443, vol. 7.

Griffin, et al., "Asynchronous Parallel Hybrid Optimization Combining DIRECT and GSS," Optimization Methods and Software, 2010, pp. 797-817, vol. 25, No. 5.

Tsay, et al., "Use of Canonical Analysis in Time Series Model Identification," Biometrika, 1985, pp. 299-315, vol. 72, No. 2.

Griffin, et al., "Asynchronous Parallel Generating Set Search For Linearly-Constrained Optimization," SIAM Journal on Scientific Computing, May 2008, pp. 1892-1924, vol. 30, No. 4.

Koch, et al., "Automated Hyperparameter Tuning for Effective Machine Learning," SAS Institute Inc., 23 pages.

Gómez, et al., Programs TRAMO and SEATS, Instruction for User (Beta Version: Sep. 1996), Working papers, Banco de España, 4 pages.

Hannan, et al., "Recursive Estimation of Mixed Autoregressive-Moving Average Order," Biometrika, 1982, pp. 81-94, vol. 69, No. 1.

Godahewa, et al., "Monash time series forecasting archive," In Thirty-fifth Conference on Neural Information Processing Systems Datasets and Benchmarks Track (Round 2), May 14, 2021, 33 pages.

Tsay, et al., "Comparison of automated procedures for ARMA model identification," Biometrika, 1985, pp. 299-315, vol. 72, No. 2.

Hwang, et al., "Automated Time-Series Cost Forecasting System for Construction Materials," Journal of Construction Engineering and Management, 2012, pp. 1259-1269, vol. 138, No. 11.

Hyndman, et al., "Automatic Time Series Forecasting: The forecast Package for R," Journal of Statistical Software, Jul. 2008, pp. 1-22, vol. 27, Issue 3.

Lee, et al., "Application of Subset Autoregressive Integrated Moving Average Model for Short-Term Freeway Traffic Volume Forecasting," Transportation Research Record, 1678(1):179-188, 1999.

Liu, "Identification of seasonal ARIMA models using a filtering method. Communications in Statistics—Theory and Methods", 18(6):2279-2288, 1989.

* cited by examiner

1300

HYPERPARAMETER TUNING IN AUTOREGRESSIVE INTEGRATED MOVING AVERAGE (ARIMA) MODELS

CROSS-REFERENCE TO RELATED APPLICATIONS

This application is a non-provisional of U.S. provisional application No. 63/644,764, filed on May 9, 2024, the entirety of which is incorporated by reference herein.

BACKGROUND

Autoregressive Integrated Moving Average (ARIMA) models are time series models that are widely used in forecasting applications. Configuring the ARIMA model requires estimating values of hyperparameters of the ARIMA model to tailor the behavior of the ARIMA model to a specific time series dataset. The values of the hyperparameters may define the quality of predictions from the ARIMA model as well as the model training process. Estimating the values of hyperparameters is a complex problem. Even the simplest ARIMA model may include several hyperparameters, such as seasonal and non-seasonal autoregressive (AR) hyperparameters, moving average (MA) hyperparameters, differencing orders, etc. Estimation of subsets of AR and MA orders further complicates the estimation process. Existing techniques for estimating the values of hyperparameters are insufficient.

SUMMARY

In accordance with at least some aspects of the present disclosure, a non-transitory computer-readable medium having computer-readable instructions stored thereon is disclosed. The computer-readable instructions when executed by a processor cause the processor to (A) determine an initial hyperparameter value for each hyperparameter in a set of hyperparameters to be tuned to generate a set of initial hyperparameter values; (B) fit an Auto-Regressive Integrated Moving Average (ARIMA) model to the set of initial hyperparameter values; (C) select a tuning method for the set of hyperparameters, wherein the tuning method comprises either a single-objective method or a multi-objective method; (D) responsive to selecting the single-objective method, compute a first objective function value from time-series data applied to the ARIMA model based on the set of initial hyperparameter values, or responsive to selecting the multi-objective method, compute at least a second objective function value and a third objective function value from the time-series data applied to the ARIMA model based on the set of initial hyperparameter values; (E) determine whether a stopping criterion for tuning the set of hyperparameters has reached; (F) responsive to determining that the stopping criterion has not reached, update the initial hyperparameter value for each hyperparameter in the set of hyperparameters to an updated hyperparameter value to generate a set of updated hyperparameter values, and repeat (B) to (F) with the set of updated hyperparameter values instead of the set of initial hyperparameter values, or responsive to determining that the stopping criteria has reached, execute (G); and (G) output a set of tuned hyperparameter values comprising a tuned hyperparameter value for each hyperparameter in the set of hyperparameters, wherein: responsive to determining that the single-objective method is selected in (C), output the set of updated hyperparameter values corresponding to a lowest first objective function value as the set of tuned hyperparameter values, or responsive to determining that the multi-objective method is selected in (C), output the set of updated hyperparameter values based on either the second objective function value or the third objective function value as the set of tuned hyperparameter values.

In accordance with at least some other aspects of the present disclosure, a system is disclosed. The system includes a memory having computer-readable instructions stored thereon and a processor that executes the computer-readable instructions to (A) determine an initial hyperparameter value for each hyperparameter in a set of hyperparameters to be tuned to generate a set of initial hyperparameter values; (B) fit an Auto-Regressive Integrated Moving Average (ARIMA) model to the set of initial hyperparameter values; (C) select a tuning method for the set of hyperparameters, wherein the tuning method comprises either a single-objective method or a multi-objective method; (D) responsive to selecting the single-objective method, compute a first objective function value from time-series data applied to the ARIMA model based on the set of initial hyperparameter values, or responsive to selecting the multi-objective method, compute at least a second objective function value and a third objective function value from the time-series data applied to the ARIMA model based on the set of initial hyperparameter values; (E) determine whether a stopping criterion for tuning the set of hyperparameters has reached; (F) responsive to determining that the stopping criterion has not reached, update the initial hyperparameter value for each hyperparameter in the set of hyperparameters to an updated hyperparameter value to generate a set of updated hyperparameter values, and repeat (B) to (F) with the set of updated hyperparameter values instead of the set of initial hyperparameter values, or responsive to determining that the stopping criteria has reached, execute (G); and (G) output a set of tuned hyperparameter values comprising a tuned hyperparameter value for each hyperparameter in the set of hyperparameters, wherein: responsive to determining that the single-objective method is selected in (C), output the set of updated hyperparameter values corresponding to a lowest first objective function value as the set of tuned hyperparameter values, or responsive to determining that the multi-objective method is selected in (C), output the set of updated hyperparameter values based on either the second objective function value or the third objective function value as the set of tuned hyperparameter values.

In accordance with at least some other aspects of the present disclosure, a method is disclosed. The method includes (A) determining, by a processor executing computer-readable instructions stored on a memory, an initial hyperparameter value for each hyperparameter in a set of hyperparameters to be tuned to generate a set of initial hyperparameter values; (B) fitting, by the processor, an Auto-Regressive Integrated Moving Average (ARIMA) model to the set of initial hyperparameter values; (C) selecting, by the processor, a tuning method for the set of hyperparameters, wherein the tuning method comprises either a single-objective method or a multi-objective method; (D) responsive to selecting the single-objective method, computing, by the processor, a first objective function value from time-series data applied to the ARIMA model based on the set of initial hyperparameter values, or responsive to selecting the multi-objective method, computing, by the processor, at least a second objective function value and a third objective function value from the time-series data applied to the ARIMA model based on the set of initial hyperparameter values; (E) determining, by the processor, whether a stopping criterion for tuning the set of hyperparameters has reached; (F) responsive to determining that the stopping criterion has not reached, updating, by the processor, the initial hyperparameter value for each hyperparameter in the set of hyperparameters to an updated hyperparameter value to generate a set of updated hyperparameter values, and repeating, by the processor, (B) to (F) with the set of updated hyperparameter values instead of the set of initial hyperparameter values, or responsive to determining that the stopping criteria has reached, executing, by the processor, (G); and (G) outputting, by the processor, a set of tuned hyperparameter values comprising a tuned hyperparameter value for each hyperparameter in the set of hyperparameters, wherein: responsive to determining that the single-objective method is selected in (C), outputting, by the processor, the set of updated hyperparameter values corresponding to a lowest first objective function value as the set of tuned hyperparameter values, or responsive to determining that the multi-objective method is selected in (C), outputting, by the processor, the set of updated hyperparameter values based on either the second objective function value or the third objective function value as the set of tuned hyperparameter values.

The foregoing summary is illustrative only and is not intended to be limiting in any way. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
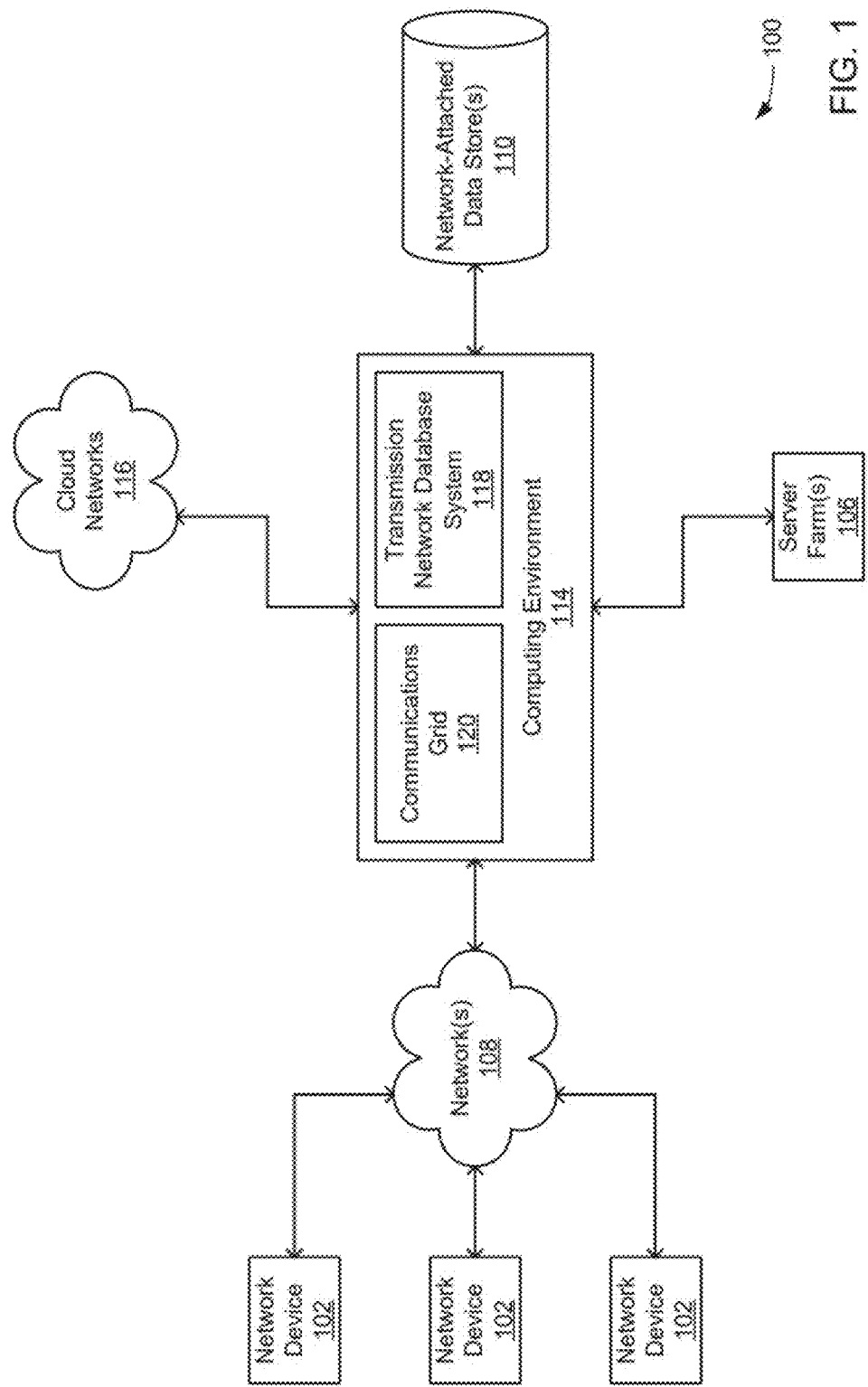
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
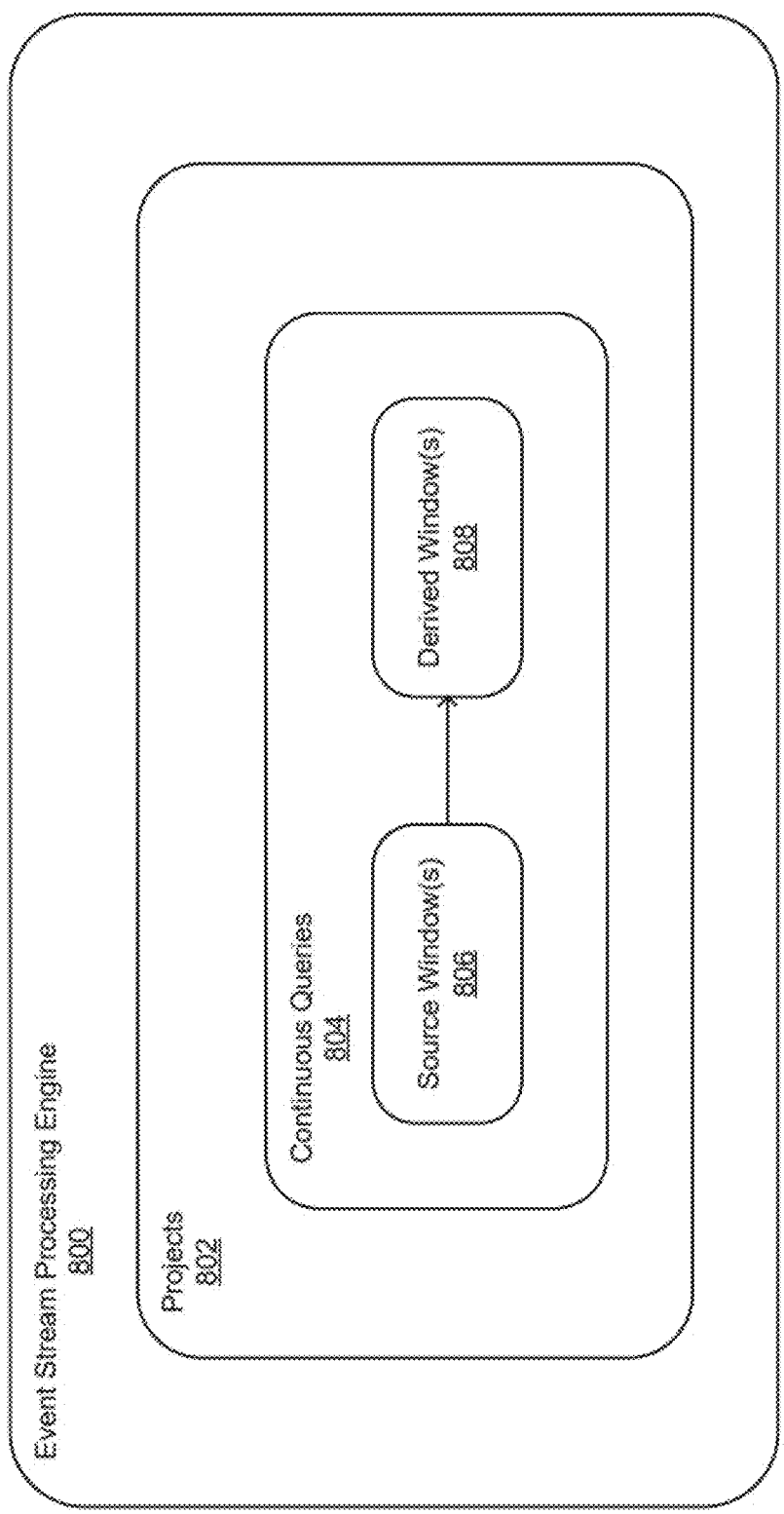
FIG. 8 illustrates a block diagram including components of an Event Stream Processing Engine (ESPE), according to embodiments of the present technology.
Figure 9:
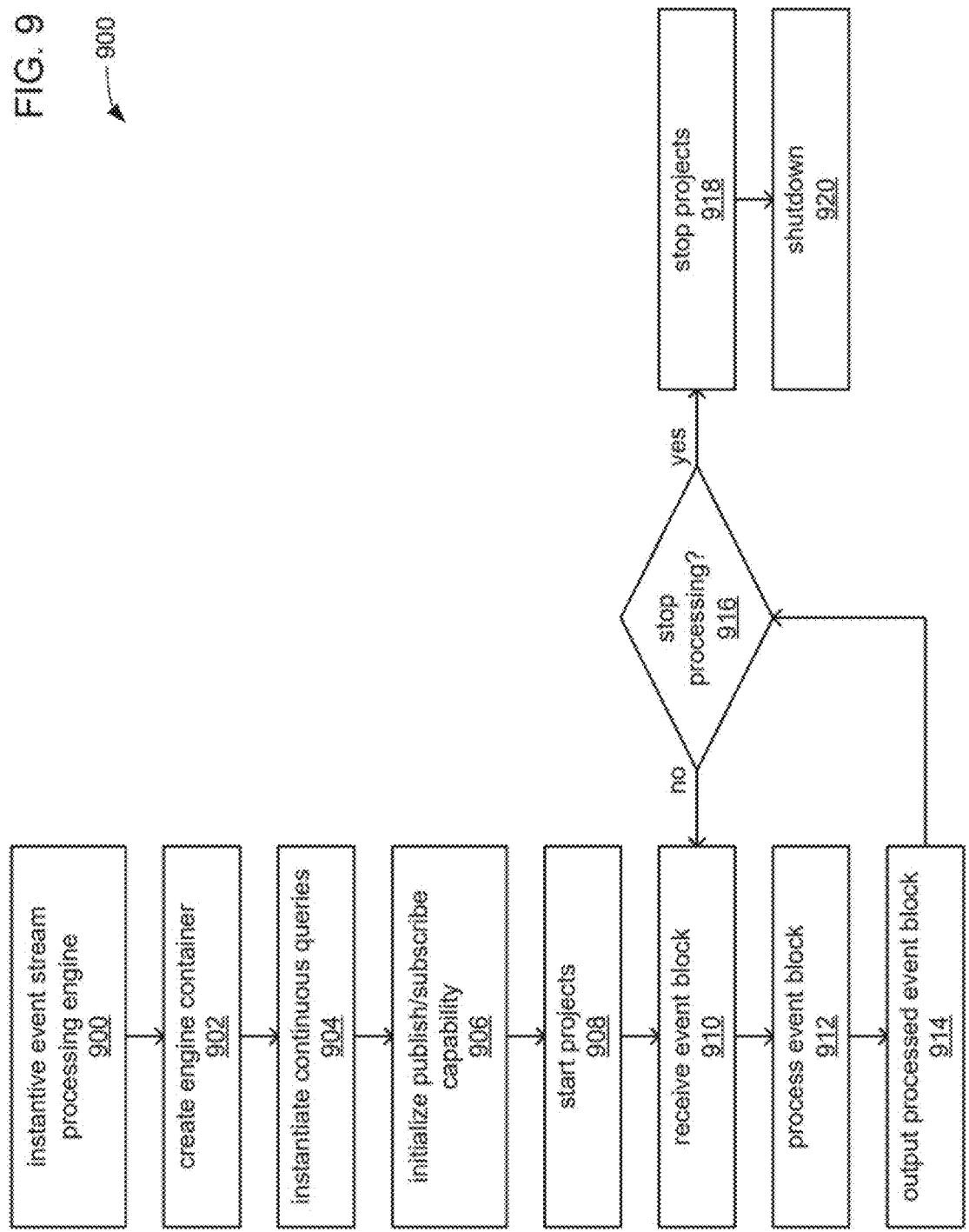
FIG. 9 illustrates a flow chart showing an example process including operations performed by an event stream processing engine, according to some embodiments of the present technology.
Figure 10:
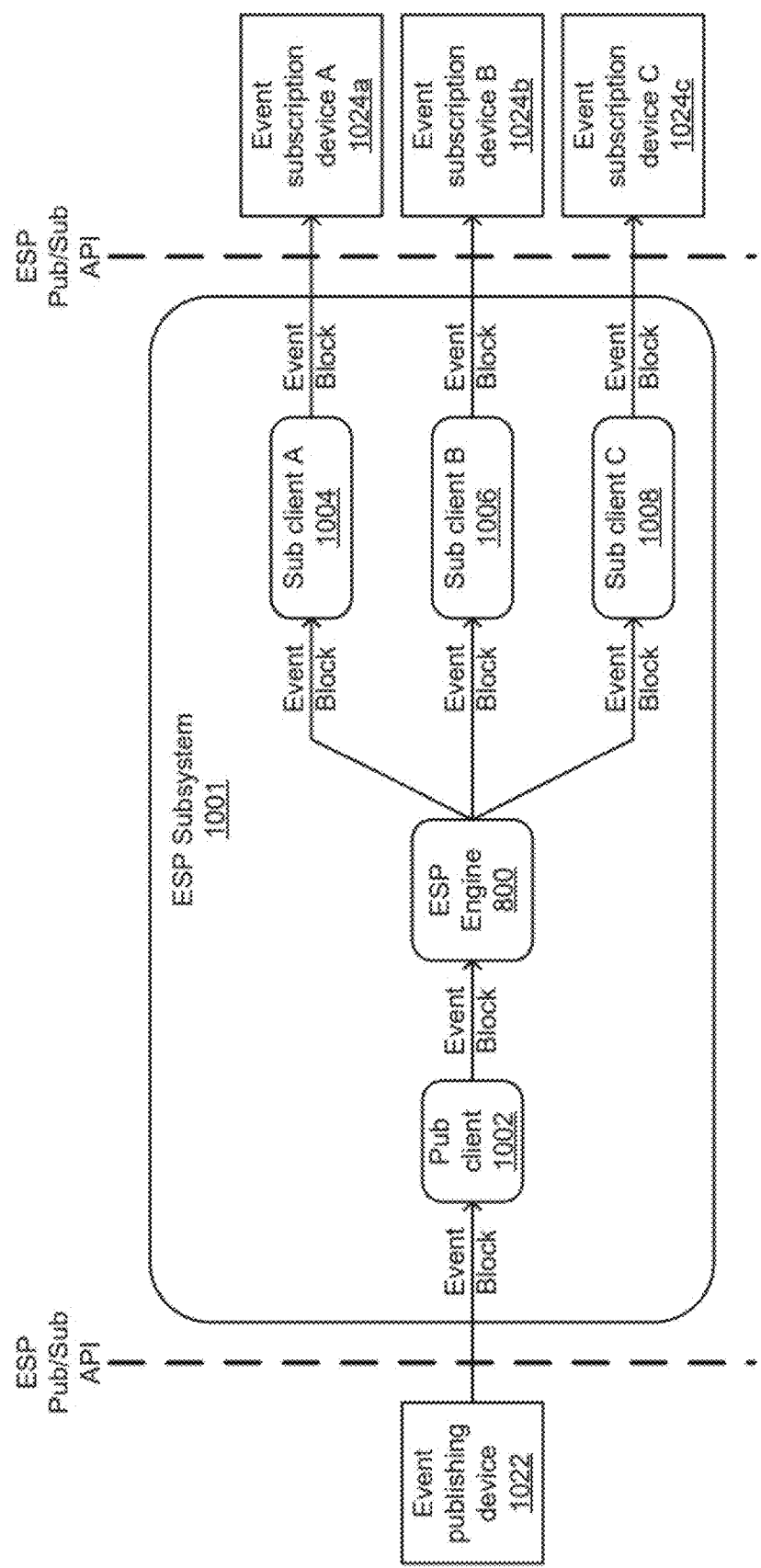
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
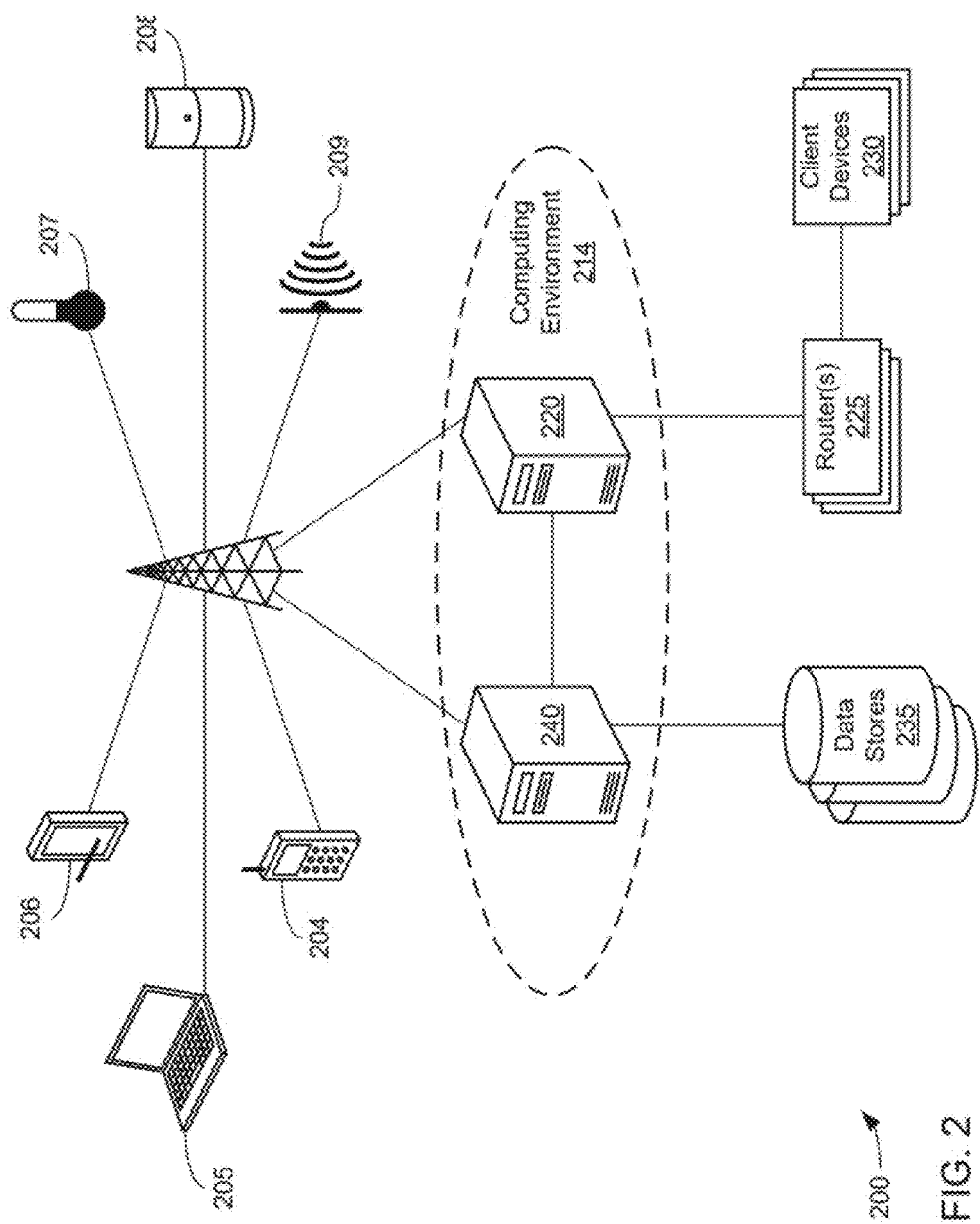
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
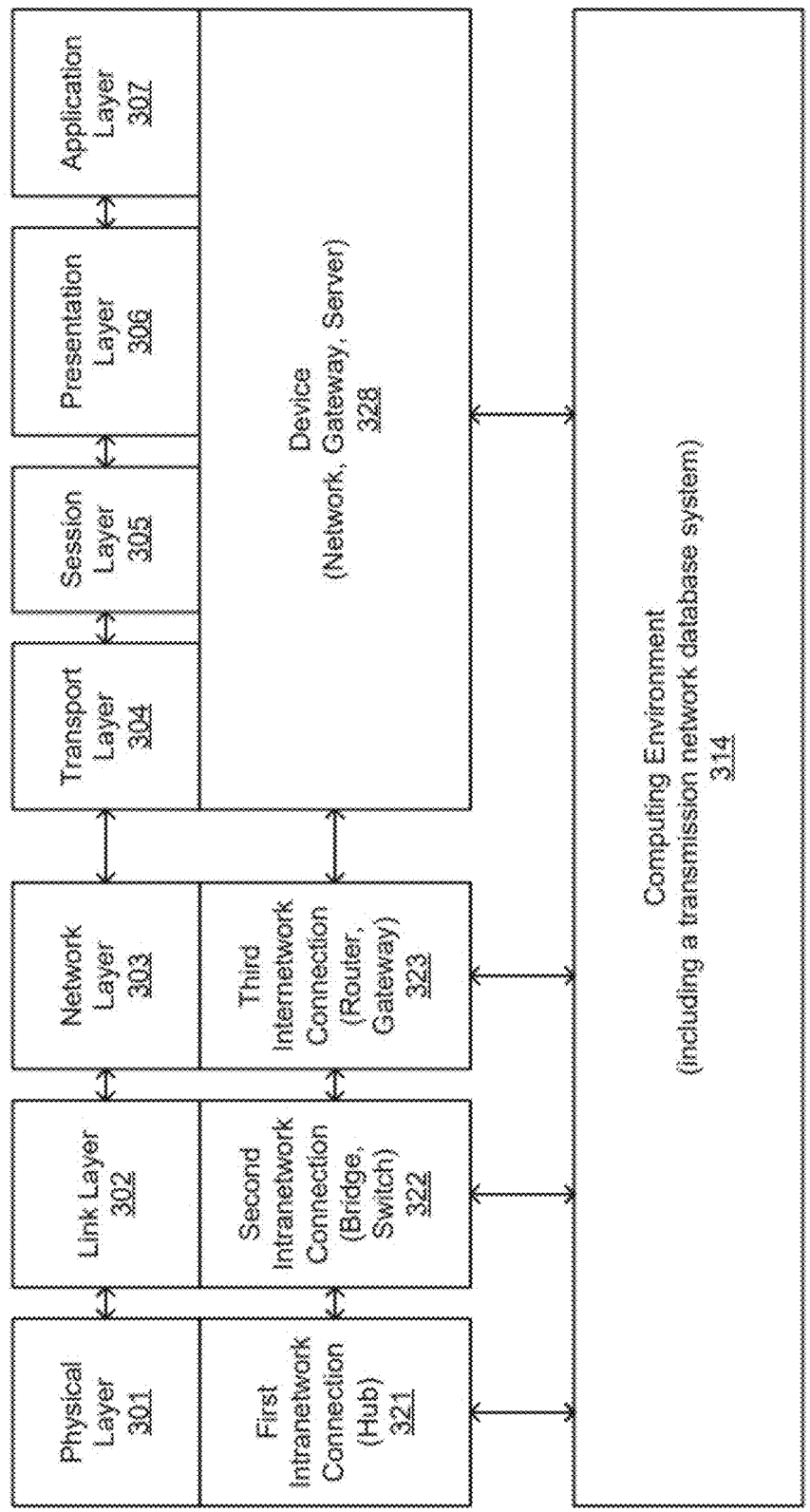
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
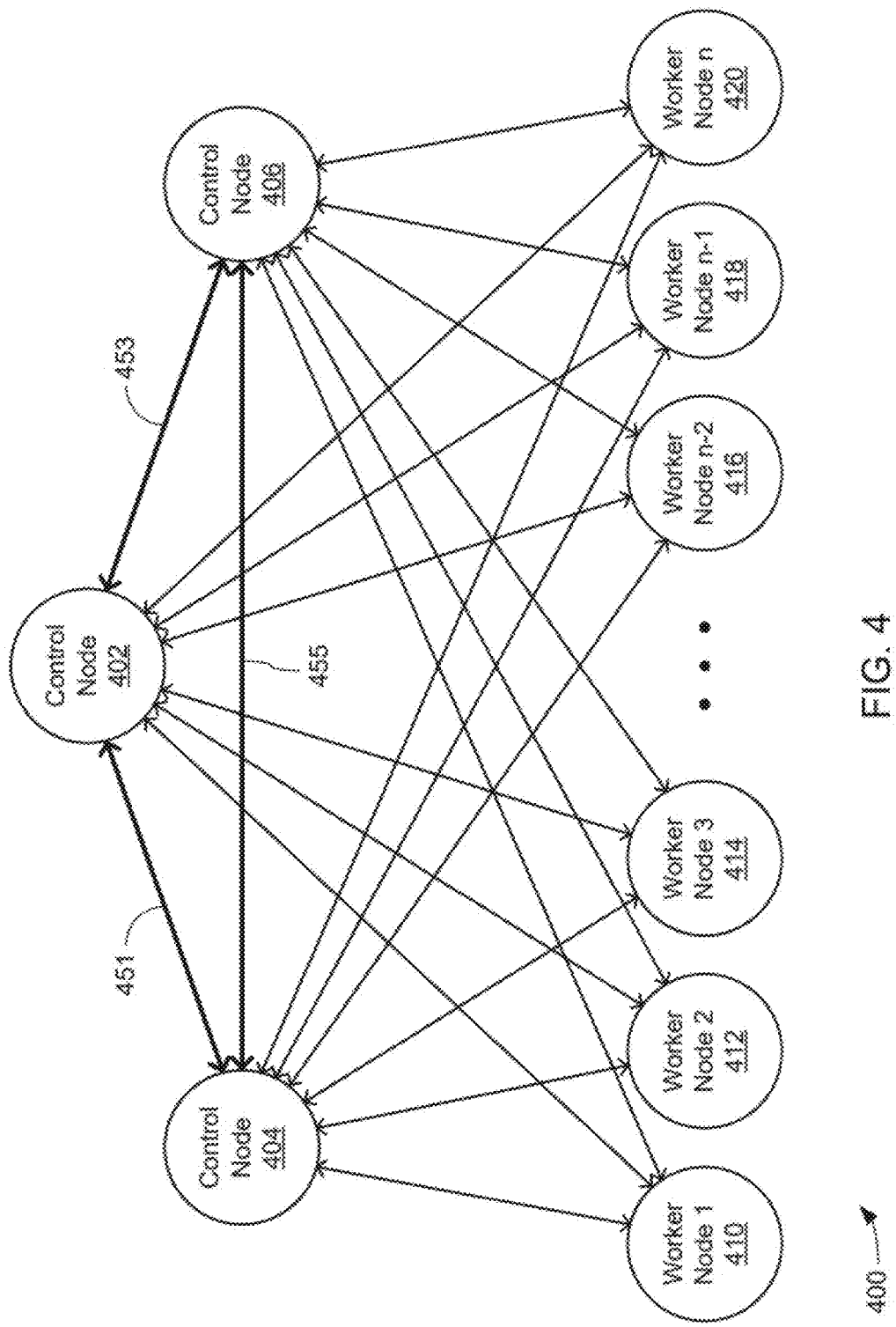
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
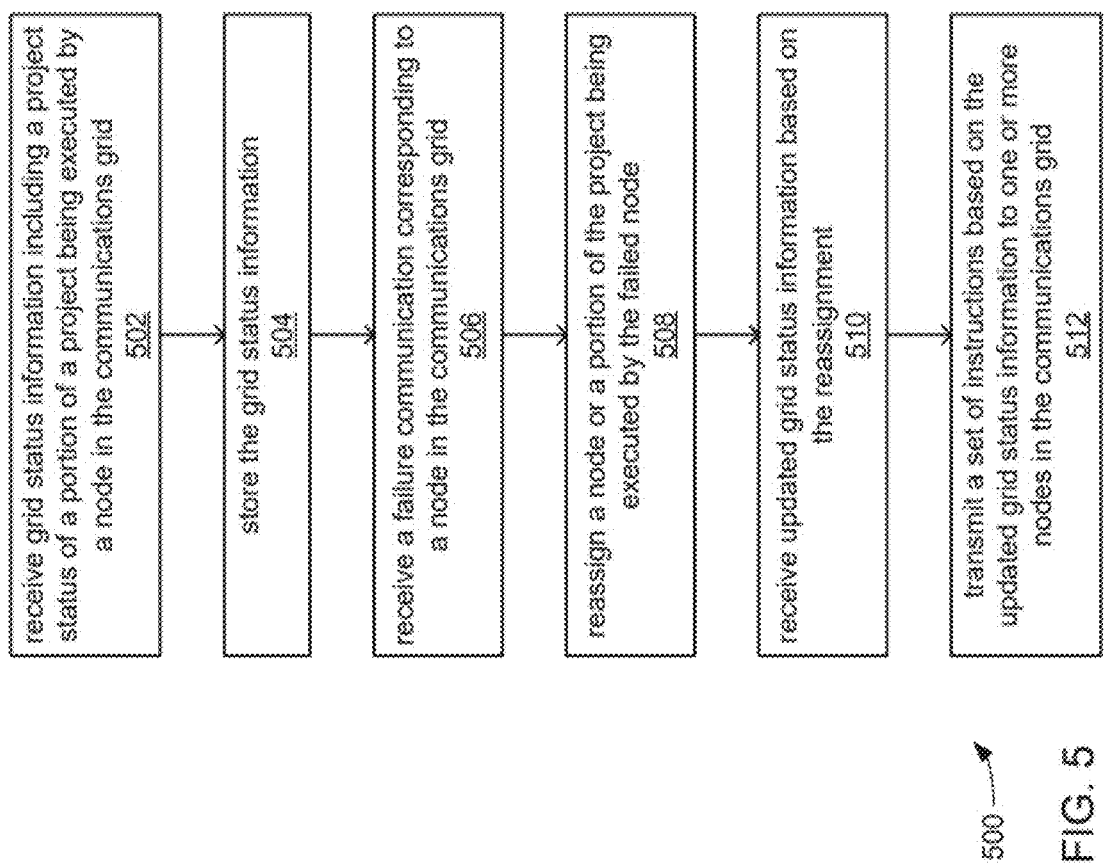
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
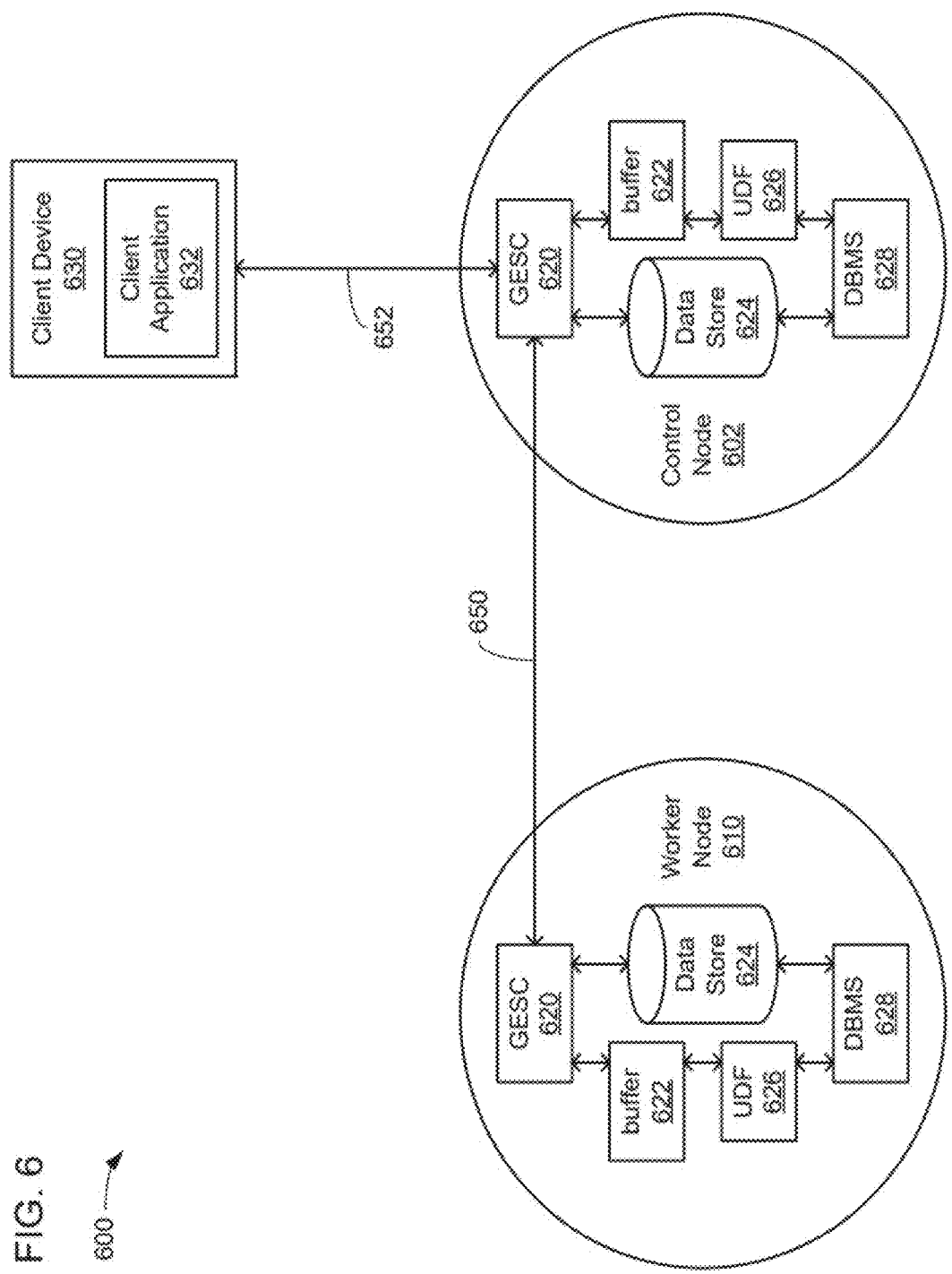
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
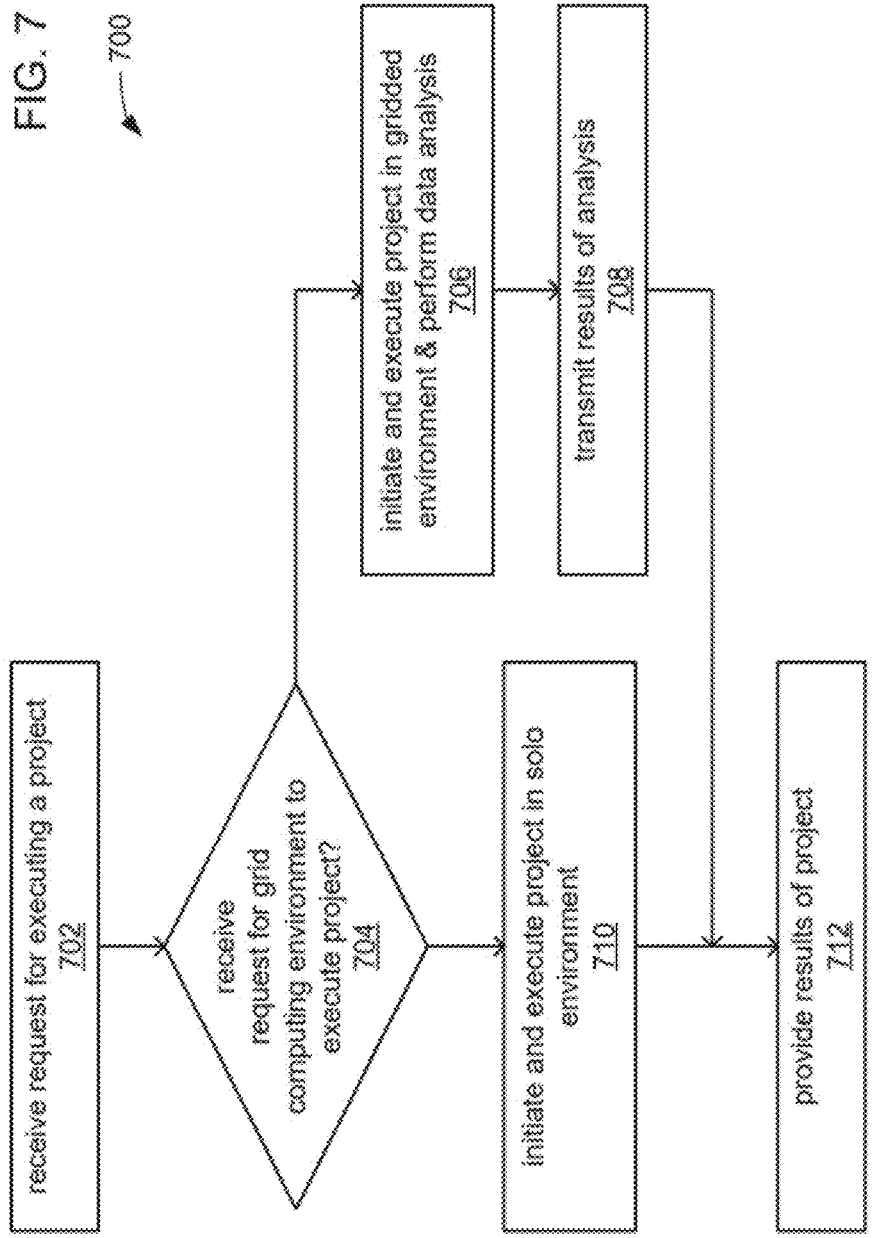
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
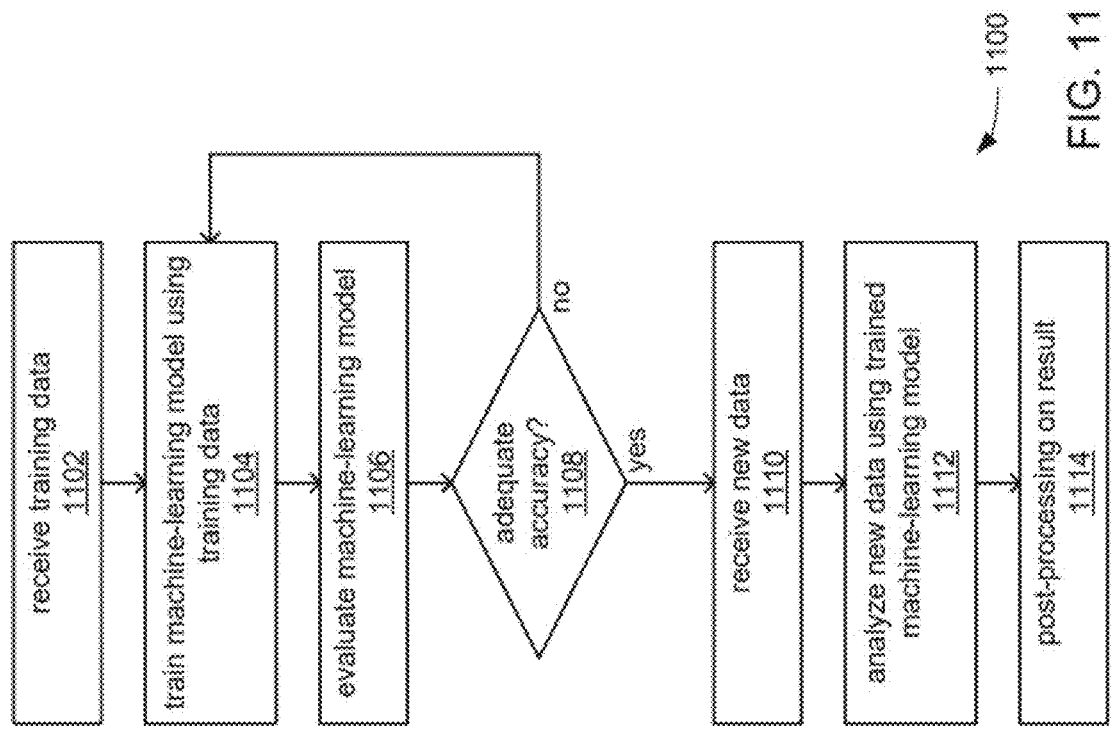
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
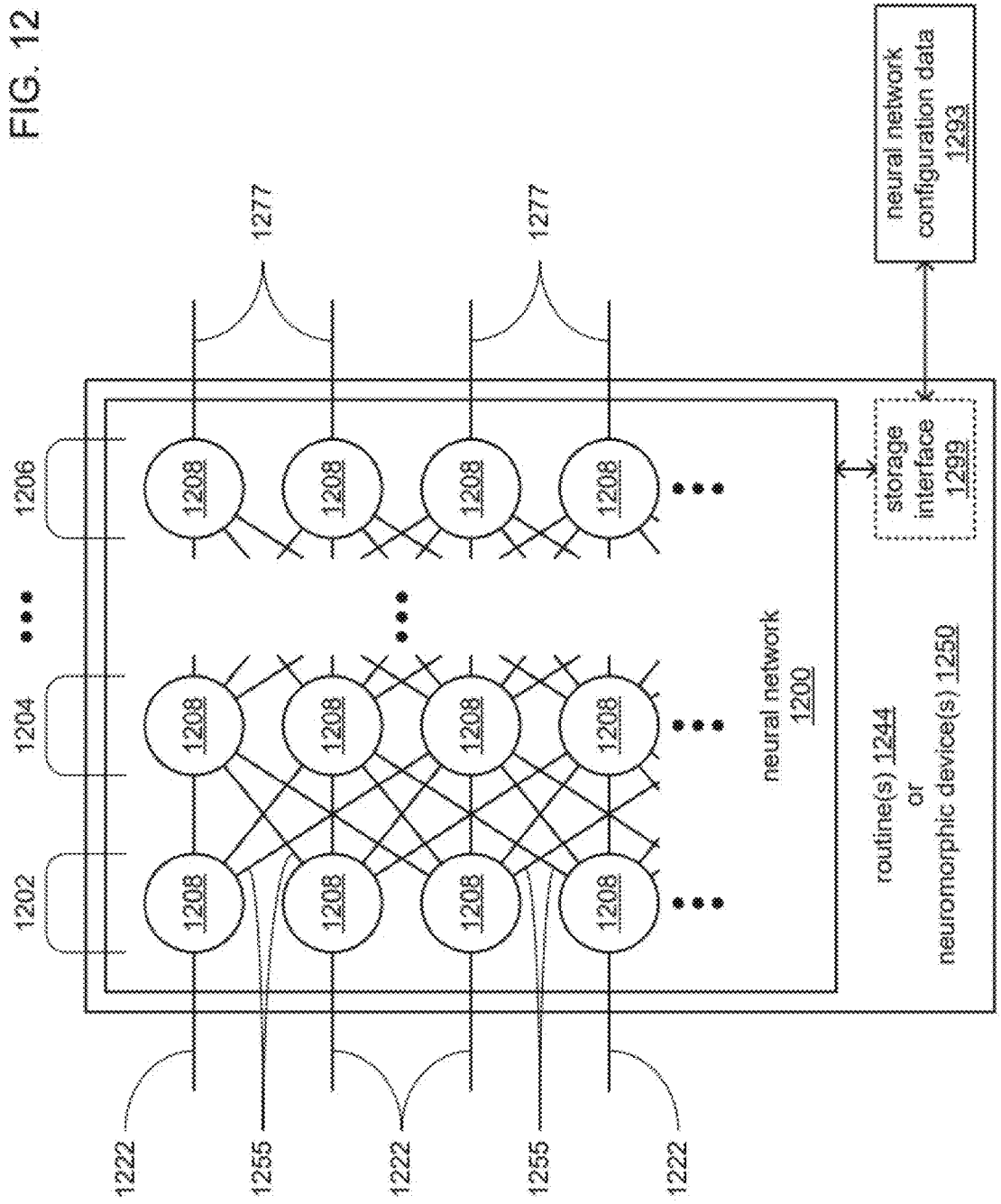
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
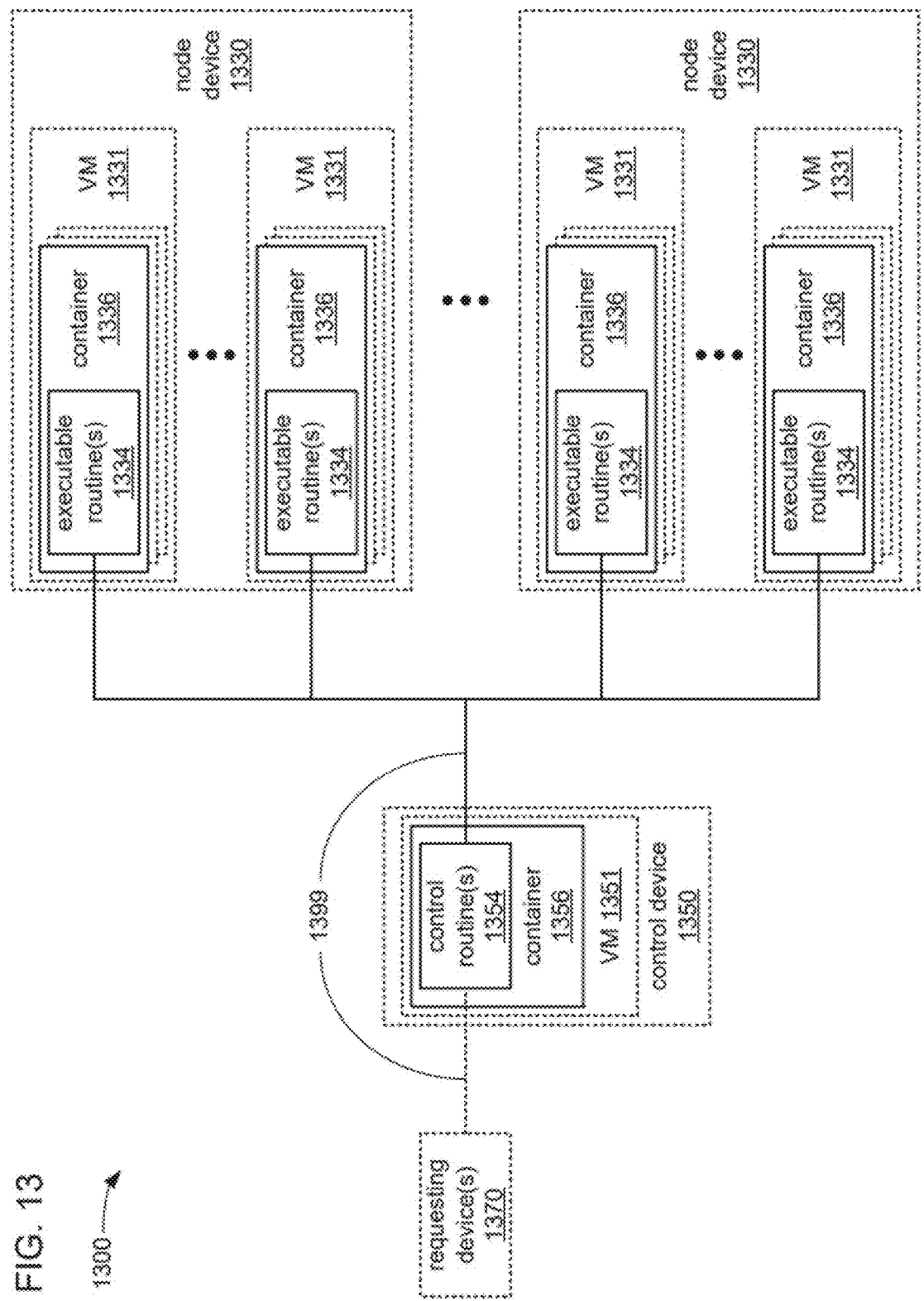
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to AutoRegressive Integrated Moving Average (ARIMA) models, and particularly to tuning values of hyperparameters of the ARIMA model for making accurate predictions in time series datasets. A time series dataset (also referred to herein as time series data) includes data that is characterized by sequential observations recorded at regular time intervals. Specifically, time series data includes an ordered collection of data points on a single subject collected over a period of time at regular time intervals and indexed in chronological order. Time series data is widely used for tracking patterns, trends, or changes over time. Using such historical time series data to predict or forecast future patterns, trends, or changes is highly desirable in domains like utilities, economics, finance, healthcare, environmental, supply chain, retail, etc. The ARIMA model is an example of a statistical model that has widespread use in forecasting applications using time series data. The ARIMA model provides a technique for modeling past time series data for forecasting or predicting possible future time series data values.

Modeling using the ARIMA model includes three aspects: Auto-Regression (AR) that accounts for past data points in the time series data, Integration or Differencing (I) that accounts for the overall trends in the time series data and Moving Average (MA) that accounts for error or noise based on the past data points in the time series data. These three aspects together make up the AR-I-MA model. The ARIMA model may be represented as ARIMA (p, d, q) where p determines the number of AR terms, d determines the order of differencing, and q determines the number of MA terms. The ARIMA model is a recursive model where future data points are predicted based on past calculations. For example, the AR term determines how reliant a future data point is on past data points. For example, a value of p=1 may indicate that an output (e.g., past, current, or future output) of the ARIMA model at a particular time interval t is directly dependent on the output of the ARIMA model at time interval t−1. If p=2, then the output of the ARIMA model may be directly dependent on the output of the ARIMA model at time interval t−1 and t−2. This shift in the time period is referred to as a "lag". The MA term determines how the current output of the ARIMA model may be related to the past error or noise calculations (e.g., size of the moving average window). For example, if q=1, the current output of the ARIMA model at time interval t may be directly related to the error or noise calculations at time interval t−1, if q=2, the output at the time interval t may be directly related to the error or noise calculations at time interval t−1 and t−2, and so on. The I term determines the general trends that occur throughout the time series data. The d value refers to the number of times differencing of the time series data trends or seasonality need to be performed to get a constant, or in other words, the number of times past time series data needs to be differenced to make the time series stationary. Stationary time series data is data that has constant statistical properties such as mean and variance.

The ARIMA model may have multiple variations: full non-seasonal ARIMA model, full seasonal ARIMA model, subset non-seasonal ARIMA model, and subset seasonal ARIMA model. The full and subset seasonal ARIMA models account for "seasonality" in the time series data. Seasonality is indicative of the regular cycles that affect the time series data. For example, in the retail context, the sales of tree ornaments may spike during Christmas time. This spike in the sales during Christmas time indicates "seasonality" that may be indicated by higher sales in the annual sales data. Seasonality may be daily, weekly, monthly, yearly, or at other time intervals. The full and subset non-seasonal ARIMA models do not account for any seasonality in the time series data. Each ARIMA model (whether full or subset, whether seasonal or non-seasonal) has a plurality of hyperparameters.

The hyperparameters of an ARIMA model define the structure of the ARIMA model. Hyperparameters may be considered tunable or configurable variables that control the training and forecasting process and accuracy of the ARIMA model. Tuning the hyperparameters may include determining optimal values of these hyperparameters such that the loss function is minimized, and predictions are more accurate. Tuning the set of hyperparameters of the ARIMA model is a complex problem. Even the simplest set of hyperparameters in an ARIMA model includes several hyperparameters, such as seasonal and non-seasonal autoregressive (AR) orders, seasonal and non-seasonal moving average (MA) orders, and differencing (I) orders. Additionally, subsets of AR and MA orders (e.g., for the subset ARIMA models) and the choice of appropriate data transformation complicates the tuning of the hyperparameters even more due to the explosion of the search space. As an example, assuming only discrete values for hyperparameters, for tuning 6 hyperparameters for a full ARIMA model, with each hyperparameter having four distinct values, there would be $4^6$ or 4096 different hyperparameter values to be searched for tuning the hyperparameters. Further, for a subset ARIMA model, with each hyperparameter having four distinct values, there would be $(2^4)^6=2^{24}=16,777,216$ different hyperparameter values to be searched. The ARIMA model, whether full or subset, may also include continuous-valued hyperparameters. For example, a hyperparameter called the Box-Cox parameter, which may be used to transform the time series data, is continuous, so it has infinite possible values. Tuning the Box-Cox hyperparameter further adds to the complexity of tuning the hyperparameters. The terms "tuning" and "estimating" or the like are used interchangeably herein.

Further, the optimal values of the hyperparameters for any given ARIMA model are highly dependent on the time series data. These optimal values, thus, change from one time series dataset to another time series dataset. Therefore, the hyperparameters need to be tuned for each time series dataset.

Tuning the hyperparameters is a notoriously tough task. The hyperparameters may be tuned through a combination of diagnostic plots, heuristic rules, and/or grid search. For example, one mechanism suggested by G. E. P. Box and G. M. Jenkins in Time-Series *Analysis: Forecasting and Control* (Holden-Day. San Francisco, 1976) involves an iterative procedure of identifying and estimating the non-seasonal orders (the AR, I, MA terms) of the ARIMA model. This procedure is not automated and relies on human feedback based on the evaluation of results of diagnostic tests and visual inspection of different plots, such as autocorrelation function (ACF) and partial autocorrelation function (PACF) plots. This mechanism is unable to tune the seasonal orders for seasonal ARIMA models or the Box-Cox parameter.

Other mechanisms for tuning hyperparameters of the ARIMA model include classical methods like extended sample autocorrelation function (ESACF), minimum information criterion (MINIC), smallest canonical correlation method (SCAN). These methods also require human judgment in deciding the parameters and are unable to tune hyperparameters for the seasonal ARIMA models. Further, each of these classical methods require manual decision-making and visualization from a user, thereby introducing a certain level of subjectivity (and therefore error) in the procedure of tuning the hyperparameters. There also exist some modem methods like the Auto-ARIMA model or the SAS Diagnose model provided by SAS Institute Inc. of Cary, North Carolina. The modem methods are automated, but they rely on tuning the Box-Cox parameter as a pre-processing step instead of tuning it simultaneously with other hyperparameters. Tuning the Box-Cox parameter as a pre-processing step may require additional time and computing resources. All the classical and modern methods mentioned above are incapable of tuning subset ARIMA models.

Another mechanism for tuning the hyperparameters of the ARIMA model includes a brute force approach. The brute force approach involves tuning the hyperparameters by checking every single combination of values of the hyperparameters in a search space and selecting the combination of values that minimizes an objective function. As seen from Table 6 below, the brute force approach is only possible when the Box-Cox parameter is not being trained. When the Box-Cox parameter, which has a continuous value, is also trained, the brute force approach is unable to tune the hyperparameters. Moreover, even when the brute force approach produces results, the number of iterations to tune the hyperparameters are enormous (particularly when compared with the results produced with the proposed approach) and practically impossible to perform in any reasonable amount of time. Thus, tuning a set of hyperparameters using a brute force approach is infeasible and undesirable. Further, the tuned hyperparameters may still not be accurate because the brute force approach is unable to tune the Box-Cox hyperparameter. Moreover, because the optimal values of the hyperparameters are dependent on the time-series data, each time the time-series data is changed, the brute force approach to retune the hyperparameters is practically impossible, thereby defeating the purpose of timely and accurate predictions.

To address the challenges above (e.g., to allow tuning hyperparameters for seasonal ARIMA models in addition to non-seasonal ARIMA models), some attempts have been made to automate the hyperparameter tuning process of the ARIMA model by using search algorithms (e.g., genetic algorithms). A search algorithm is designed to solve a search problem, which involves the retrieval of information calculated in the search space of the problem domain. For example, a genetic algorithm is a type of search algorithm which works as a metaheuristic inspired by the process of natural selection. These genetic algorithms may be used to find high-quality solutions to search problems through processes inspired from evolution, such as mutation, crossover and selection. However, the genetic algorithms and other existing search-based mechanisms to tune hyperparameters of the ARIMA model are only able to handle a limited form of the general ARIMA model. For example, none of the existing search-based mechanisms are able to estimate with accuracy a Box-Cox hyperparameter and the intercept parameter commonly used in ARIMA models, simultaneously while tuning the other hyperparameters of the ARIMA model. Moreover, when tuning hyperparameters for subset ARIMA models, the search space becomes exponentially large (even without the Box-Cox parameter), since instead of estimating six integer orders, the search needs to be conducted over a power set (e.g., set of all subsets) of all integers from one to the order in consideration.

Further, some conventional techniques use derivatives to tune the hyperparameters for the ARIMA model. Specifically, each hyperparameter of the ARIMA model may be associated with an "objective function." The optimal or tuned value of each hyperparameter may correspond to the value at which the value of the objective function is minimized (or maximized). Tuning hyperparameters by minimizing (or maximizing) the objective functions may involve computing a value of the objective function. If the computed value is not the optimal value, a direction directive of the objective function is determined. The direction derivative may determine the direction in which the computed value needs to move (e.g., increased or decreased) to move towards the optimal value. The step size by which the computed value needs to move in the direction directive may be considered a step size derivative. In each iteration, the direction derivative and the step size derivative may be determined, and the computed value of the objective function may be adjusted until the optimal value is achieved. Such derivative based optimization techniques have shortcomings. For example, derivative-based approaches require the existence of, and access to, the derivative of the objective function. In other words, the objective function needs to be somewhat smooth for this approach to work. Derivative-free approaches do not require the derivatives of the objective function to exist.

Thus, the existing techniques for tuning the hyperparameters of the ARIMA model have technical problems. The present disclosure provides technical solutions to these technical problems for tuning an ARIMA model's hyperparameters by using a derivative-free optimization framework. The proposed derivative-free optimization framework provides a particular solution to the problem of tuning (or autotuning) hyperparameters for the ARIMA model. This derivative-free optimization framework does not assume the existence of derivatives of the objective function. Since the six order hyperparameters in the case of ARIMA models are discrete, the objective function may be discontinuous, and the objective function derivatives may not exist. Thus, the proposed derivative-free approach provides a good choice for ARIMA hyperparameter tuning. Further, with the proposed derivative-free optimization framework, a new set of potential optimization methods may be applicable which are not restricted to the commonly used derivative-based methods.

The derivative free optimization framework uses parallel and distributed processing for smart, automated, and efficient traversal of the search space. Unlike conventional methods, the proposed approach is able to effectively tune both subset and full ARIMA seasonal and non-seasonal models. The proposed approach is also able to tune the Box-Cox hyperparameter along with the other hyperparameters of the ARIMA model including the intercept hyperparameter. The proposed approach also uses a multi-objective optimization technique to regularize validity and complexity of an ARIMA model (e.g., by computing a complexity value that determines the number of hyperparameters to be estimated for any given ARIMA model).

Further, because the proposed approaches are derivative free, the iterations are not dependent upon the values computed in the previous iteration. As a result, each iteration may be computed in parallel using distributed processing. Thus, the present disclosure is easily able to leverage distributed and parallel processing, which also reduces the total time needed to tune the hyperparameters. Further, by using distributed processing, the amount of computing resources needed in each computing device may be reduced (e.g., less memory, fewer computing cores, etc.). Thus, the present disclosure provides practical applications (e.g., technical improvements) that are rooted in technology by accurately tuning hyperparameters for all variations of ARIMA models. The proposed approach provides a particular solution to tuning the hyperparameters of the ARIMA model in a way that addresses the particular technical problems identified herein.

The proposed approach cannot be practically performed in the human mind. Nor can it be practically performed using pen and paper. Tuning the hyperparameters is a complex and time intensive process that requires a computing device. A human mind (or using pen and paper) is incapable of automatically tuning all hyperparameters (including the Box-Cox hyperparameter) of an ARIMA model accurately for time series datasets in a reasonable amount of time. The concepts of the present disclosure are not directed to any observations, evaluations, judgments, or opinions that a human mind can practically perform. A human mind is not equipped to automatically and accurately tune hyperparameters of all variations of the ARIMA model by using a derivative-free approach that involves determining an initial hyperparameter value for each hyperparameter in a set of hyperparameters to be tuned to generate a set of initial hyperparameter values, fitting an Auto-Regressive Integrated Moving Average (ARIMA) model to the set of initial hyperparameter values, selecting a tuning method (e.g., single-objective method or a multi-objective method) for the set of hyperparameters, responsive to selecting the single-objective method, computing a first objective function value from time-series data applied to the ARIMA model based on the set of initial hyperparameter values, or responsive to selecting the multi-objective method, computing at least a second objective function value and a third objective function value from the time-series data applied to the ARIMA model based on the set of initial hyperparameter values, determining whether a stopping criterion for tuning the set of hyperparameters has reached, responsive to determining that the stopping criterion has not reached, updating the initial hyperparameter value for each hyperparameter in the set of hyperparameters to an updated hyperparameter value to generate a set of updated hyperparameter values, and repeating the above process with the set of updated hyperparameter values instead of the set of initial hyperparameter values, or responsive to determining that the stopping criteria has reached, outputting a set of tuned hyperparameter values.

Further, the present disclosure does not recite a mathematical concept, but is rather based on or involves mathematical concepts. In other words, the present disclosure is not directed to mathematical relationships, any specific mathematical formulas or equations, or any particular mathematical calculations. Rather, the present disclosure is directed to systems and methods that use an optimization framework in a non-conventional manner for tuning hyperparameters for the ARIMA model.

Figure 14:
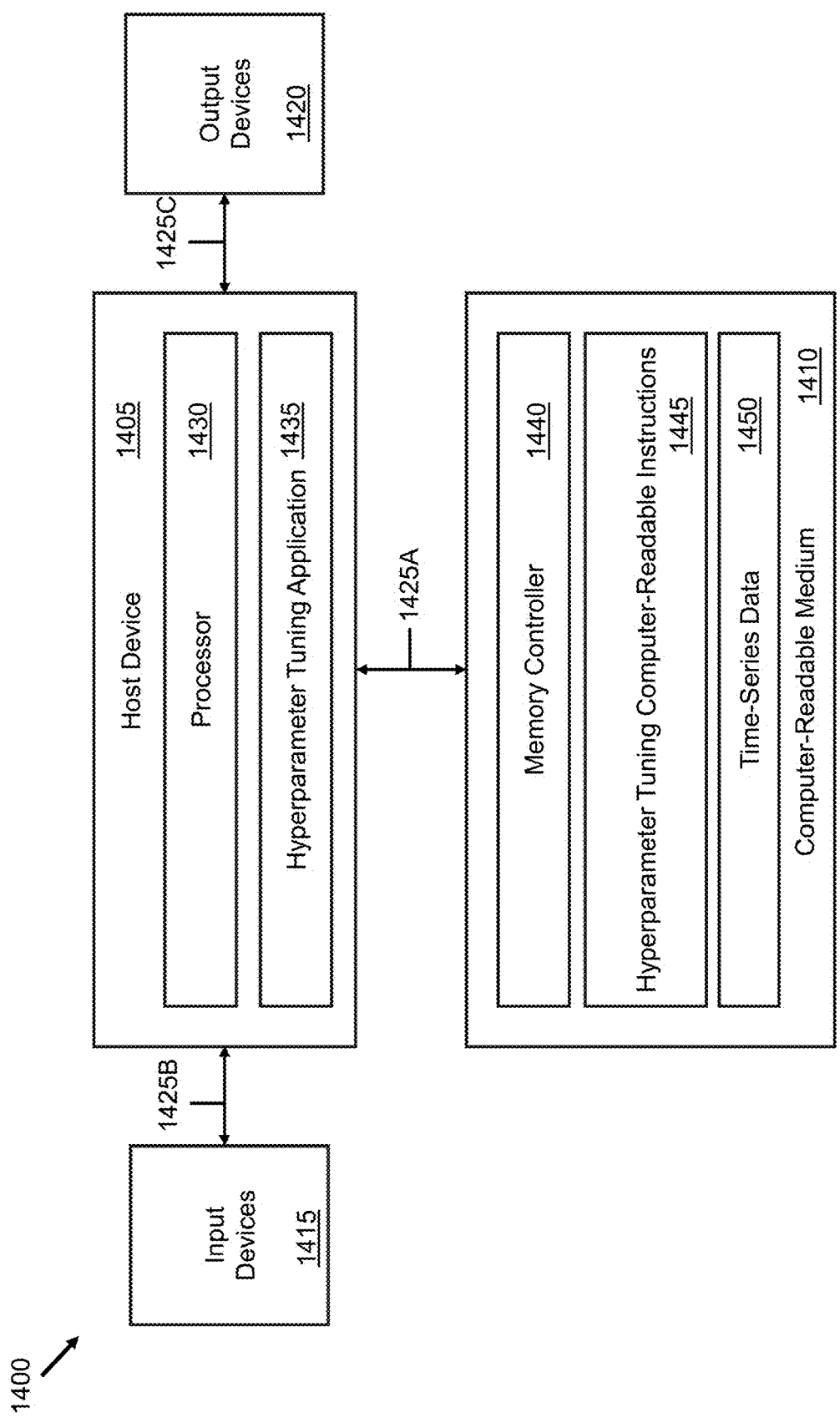
FIG. 14 illustrates a block diagram of an example hyperparameter tuning system for an ARIMA model, according to embodiments of the present technology.

Turning now to FIG. 14, a block diagram of an example hyperparameter tuning system 1400 is shown, in accordance with some embodiments of the present disclosure. The hyperparameter tuning system 1400 may be part of, or otherwise associated with, the computing environment 114. The hyperparameter tuning system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The hyperparameter tuning system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the Hyperparameter tuning system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the Hyperparameter tuning system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a hyperparameter tuning application 1435. The hyperparameter tuning application 1435 may be used to estimate or otherwise tune the values of hyperparameters for a particular dataset. The hyperparameter tuning application 1435 may implement an optimization framework to tune the values of the hyperparameters. The optimization framework is discussed in more detail below.

The hyperparameter tuning application 1435 may be executed by the processor 1430. The instructions to execute the hyperparameter tuning application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the hyperparameter tuning system 1400 and operatively associated with the computer-readable medium 1410. The memory controller 1440 may be configured as a logical block or circuitry that receives instructions from the host device 1405 and performs operations in accordance with those instructions. For example, to execute the hyperparameter tuning application 1435, the host device 1405 may send a request to the memory controller 1440. The memory controller 1440 may read the instructions associated with the hyperparameter tuning application 1435. For example, the memory controller 1440 may read hyperparameter tuning computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store time-series data 1450. The time-series data 1450 may include the specific dataset for which the hyperparameter tuning application 1435 tunes the hyperparameters for.

It is to be understood that only some components of the hyperparameter tuning system 1400 are shown and described in FIG. 14. However, the hyperparameter tuning system 1400 may include other components such as various batteries and power sources, networking interfaces, routers, switches, external memory systems, controllers, etc. Generally speaking, the hyperparameter tuning system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
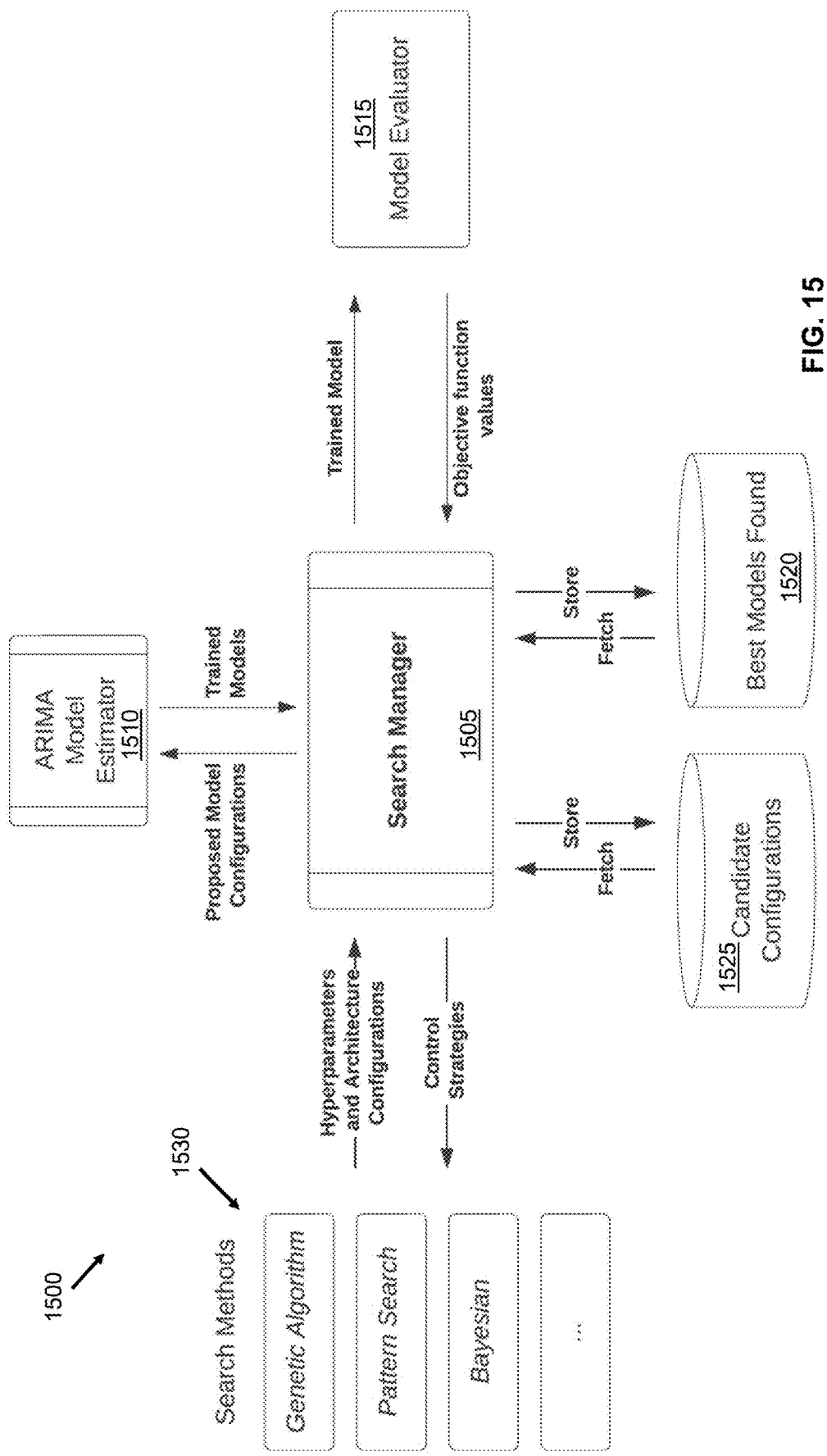
FIG. 15 illustrates a block diagram of an example framework to be used by the hyperparameter tuning system of FIG. 14 for tuning values of hyperparameters of the ARIMA model, according to embodiments of the present technology.

Turning to FIG. 15, a block diagram of an example optimization framework 1500 is shown, in accordance with some embodiments of the present disclosure. The optimization framework 1500 may be implemented by the hyperparameter tuning application 1435 to automatically tune hyperparameters for the ARIMA model. In some embodiments, the optimization framework 1500 may include a search manager 1505 that is configured to tune hyperparameters for an ARIMA model. To tune the hyperparameters, the search manager 1505 is communicatively associated with a model evaluator 1515. The search manager 1505 may drive a plurality of search methods in parallel for tuning the hyperparameters. In particular, the search manager 1505 may perform operations for tuning the hyperparameters for a specific time series dataset for the ARIMA model. The search manager 1505 may send proposed configurations (e.g., values) of hyperparameters to an ARIMA model estimator 1510 (which may implement an ARIMA model), which may then evaluate the ARIMA model using the proposed configurations received from the search manager. In particular, the ARIMA model estimator 1510 may estimate values of one or more coefficients of the ARIMA model based on the proposed configurations and send the values of the estimated coefficients back to the search manager 1505 as trained models. The search manager 1505 may send the trained models to the model evaluator 1515 which may send objective function values (e.g., optimal objective function values) for the trained models back to the search manager.

The search manager 1505 may store the received values of the objective functions in a database 1520. When a stopping criterion for tuning the hyperparameters is reached, the search manager 1505 may fetch all of the saved values of the objective functions from the database 1520 to determine the optimal value of the objective function. The hyperparameter values (stored in database the 1520) corresponding to the optimal value of the objective functions may be the tuned hyperparameters. The search manager may also save candidate configurations in database 1525. Although the database 1520 and the database 1525 are shown as separate databases, in some embodiments, both those databases may be combined, and the combined database may store the data stored by the individual databases. The candidate configurations stored in the database 1525 may include the proposed configurations (e.g., values) of the hyperparameters for the ARIMA model and the variables (e.g., intercept, seasonal, non-seasonal, etc.) to be used in the ARIMA model. As discussed below, the ARIMA model may have different variations. Each variation may include different hyperparameters and variables. Based on the desired variation of the ARIMA model that is to be trained, the search manager 1505 determines the variables and hyperparameter values for that desired variation and sends that to the model evaluator 1515.

In some embodiments, the search manager 1505 may be configured to support multiple search methods 1530. Example search methods may include the genetic algorithm, pattern search, Bayesian optimization, etc. In other embodiments, the search methods 1530 may include other or additional search methods. In some embodiments, the search manager 1505 may use one or more of the search methods 1530 to generate the proposed configurations (e.g., values) of the hyperparameters for the ARIMA model. In some embodiments, the search manager 1505 may send control strategies to one or more of the search methods 1530. These control strategies may include information and instructions that may affect the setup phase, which algorithms to initialize, problem dimensions and variables, objective or objectives value, iterative and final state values, etc. In response to the control strategies, the one or more search methods 1530 may provide hyperparameter and architecture configurations which refer to the structure and functioning of the search methods being used and the tuned hyperparameters that are returned to the search manager 1505. The architecture configuration may include the general architecture of the one or more search methods 1530.

In some embodiments, the optimization framework 1500 may be part of an Autotune framework. Additional details of the Autotune framework are provided in U.S. Pat. No. 10,360,517, titled "Distributed Hyperparameter Tuning System for Machine Learning", issued on Jul. 23, 2019, the entirety of which is incorporated by reference herein. Details about the Autotune framework may also be found in Patrick N. Koch, Oleg Golovidov, Steven Gardner, Brett Wujek, Joshua D. Griffin, and Yan Xu, Autotune: A derivative-free optimization framework for hyperparameter tuning, proceedings of the 24th ACM SIGKDD International Conference on Knowledge Discovery & Data Mining, 2018, the entirety of which is incorporated by reference herein.

The ARIMA model is a versatile and robust framework that captures the temporal dependencies and inherent structures of time series data. Some extensions of ARIMA, such as seasonal ARIMA (also known as SARIMA), subset ARIMA, and ARIMA with exogenous variables, have been used in a wide range of forecasting tasks. The efficacy of these methods lies in their ability to capture complex temporal dependencies and handle various time series characteristics like trends and seasonal patterns.

ARIMA models may use Box-Cox transformations to stabilize variance and achieve normality in data distributions (e.g., to make data more Gaussian-like). Assuming positive data for simplicity of explanation, a Box-Cox transformation may be defined as follows:

Let $S \subseteq R+$ be a given set of positive real numbers. The Box-Cox transformation of $y \in S$ corresponding to the transformation parameter $\lambda \in R$ is given by $$f_\lambda(y) = \begin{cases} \dfrac{y^\lambda - 1}{\lambda}, & \lambda \neq 0 \\ \ln(y), & \lambda = 0 \end{cases} \qquad \text{Equation 1}$$

When $\lambda=0$, the transformation becomes a natural logarithm, stabilizing variance of the data set S. For other values of $\lambda$, the skewness and kurtosis of the data may be adjusted, aiding in normality. $\lambda$ may be estimated using maximum likelihood estimation, which seeks the value that maximizes the likelihood of the data being normally distributed. Alternatively, cross-validation techniques may be employed to find the optimal $\lambda$ that minimizes prediction error. Additional details of the Box-Cox transformation are discussed by G. E. P. Box and D. R. Cox in "An analysis of transformations," Journal of the Royal Statistical Society, Series B (Methodological), 26(2):211-252, 1964, the entirety of which is incorporated by reference herein.

The ARIMA model may be a full ARIMA model or a subset ARIMA model. The full ARIMA model may also be referred to as a general ARIMA model. Each of the full ARIMA model and the subset ARIMA model may have seasonal and non-seasonal variations.

A full non-seasonal ARIMA model for a time series $\{X_t\}_{t \in N}$ may be defined as ARIMA(p, d, q), if:

$$\phi(B)(1-B)^d X_t = c + \theta(B)\epsilon_t, \quad \text{Equation 2}$$

In Equation 2 above, c is the intercept term, $\epsilon_t$ are error terms that are independent and normally distributed with mean 0 and variance $\sigma^2$, B is the backshift operator given by $B(X_t) = X_{t-1}$, d is the degree of non-seasonal differencing, while $\phi$ and $\theta$ are real polynomials of order p and q representing the autoregressive (AR) and moving-average (MA) parts of the model, respectively. When a non-seasonal ARIMA model is estimated, the coefficients of polynomials $\phi$ and $\theta$, and intercept c are estimated to optimize a predetermined objective function by using a predetermined optimization method. Assuming that $\phi$ and $\theta$ have no roots inside the unit circle $|z|<1$, to ensure causality and invertibility, the full non-seasonal ARIMA model may be characterized by three parameters: p, d, and q. The unit circle $|z|$ may be defined as the set of all points z on the complex plane search (e.g., complex numbers whose magnitude is less than 1). The value of the autoregressive parameter p describes how many preceding observations influence the current observation $X_t$. The moving-average term q stands for the number of previous random shocks $\epsilon_t$ that are needed to describe the dependency present in the time series. The parameter d represents the order of differencing that needs to be applied to stabilize the mean of the time series. As an example, the (0, 0, 0) process has no dependency structure, and is commonly referred to as "white noise."

In case of stationary time-series data, all moments including mean and variance are constant over time. Therefore, stationary time-series data are already stable and do not require differencing or other transformations. Some ARIMA models may exhibit seasonal behavior. A seasonal pattern in time-series data occurs when a time series is influenced by seasonal factors like the day of the week, month of the year, etc. Thus, seasonality may manifest as a fixed, known frequency.

A full general (non-seasonal and seasonal) ARIMA model for a time series $\{X_t\}_{t \in N}$ may be defined as ARIMA(p, d, q)(P, D, Q)$_S$, if $$\phi(B)\Phi(B^S)(1-B)^d(1-B^S)X_t = c + \theta(B)\Theta(B^S)\epsilon_t, \quad \text{Equation 3}$$

where $\Phi$ and $\Theta$ are polynomials of orders P and Q respectively. P denotes the seasonal AR order and Q denotes the seasonal MA order. It is assumed that neither $\Phi$ nor $\Theta$ contains any root inside the unit circle. S is the seasonality or seasonal frequency of the time series, and D is the degree of seasonal differencing. When a general seasonal ARIMA model is estimated, the coefficients of polynomials $\phi$, $\Phi$, $\theta$, and $\Theta$, and intercept c are estimated to optimize a predetermined objective function by using a predetermined optimization method.

Based on Equations 1, 2, and 3, the hyperparameters to be tuned or estimated for full general ARIMA models are listed in Table 1 below:

TABLE 1

| Hyperparameter | Type | Range | Details |
| --- | --- | --- | --- |
| λ | Continuous | [−5, 5] | Box-Cox parameter |
| Intercept | Boolean | {0, 1} | Indicator of inclusion of intercept, where 1 represents presence of intercept |
| p | Discrete | [0, 9] ∩ Z | Non-seasonal autoregressive order |
| d | Discrete | [0, 2] ∩ Z | Degree of non-seasonal differencing order |
| q | Discrete | [0, 9] ∩ Z | Non-seasonal moving-average order |
| P | Discrete | [0, 3] ∩ Z | Seasonal autoregressive order |
| D | Discrete | [0, 2] ∩ Z | Degree of seasonal differencing |
| Q | Discrete | [0, 3] ∩ Z | Seasonal moving-average order |

In Table 1 above, the column labeled "Hyperparameter" lists the variable that is used to represent a particular hyperparameter and the column labeled "type" indicates whether that hyperparameter is a continuous value, a discrete value, or a Boolean value. The column labeled "Range" indicates the value range that a particular hyperparameter may have. The ranges for discrete variables are subsets of integers (Z), while those for Boolean variables are the set {0,1}. Ranges of continuous variables are subsets of real numbers. The optimal value of a hyperparameter may lie within its specified range. In some embodiments, the range, as well as an optimal value of each hyperparameter may be dependent on the search method used for tuning the hyperparameter. The column labeled "Details" provides a brief definition of the associated hyperparameter.

In case of the full non-seasonal ARIMA(p, d, q) model, each one of the preceding p observations and previous q random shocks may be required to model the current observation $X_t$. Similarly for a full seasonal ARIMA model, all previous lags corresponding to the seasonal orders may be required. In some scenarios, not all previous lags may be desired to be used. By selectively using the lags, in some embodiments, the subset ARIMA model (whether seasonal or non-seasonal) may improve the forecasts.

A seasonal subset ARIMA model for a time series $\{X_t\}_{t \in N}$ may be subset ARIMA($S_p$, d, $S_q$)($S_P$, D, $S_Q$)$_S$ model, if:

$$(1-\Sigma_{i \in S_p}\phi_i B^i)(1-\Sigma_{i \in S_P}\Phi_i B^{iS})(1-B)^d(1-B^S)^D X_t = c + (1-\Sigma_{i \in S_q}\theta_i B^i)(1-\Sigma_{i \in S_Q}\Theta_i B^{iS})\epsilon_t, \quad \text{Equation 4}$$

where $S_p$, $S_P$, $S_q$, and $S_Q$ denote subsets of non-seasonal AR orders, seasonal AR orders, non-seasonal MA orders, and seasonal MA orders, respectively. $S_p$ is an element in the power set P[p], which is the power set of the set {1, 2, ..., p}. Similarly, $S_P$, $S_q$, and $S_Q$ are elements of power sets P[P], P[q], and P[Q], respectively. A power-set of a set K is a set that contains all subsets of the set K. The terms B, S, d, D, c, and Et were defined above. $\phi_i$ and $\Phi_i$ denote the non-seasonal and seasonal AR coefficients, respectively. $\theta_i$ and $\Theta_i$ denote the non-seasonal and seasonal MA coefficients, respectively.

Based on Equation 4, the hyperparameters to be tuned or estimated for subset ARIMA seasonal and non-seasonal models are listed in Table 2 below:

TABLE 2

| Parameter | Type | Range | Details |
| --- | --- | --- | --- |
| λ | Continuous | [−5, 5] | Box-Cox parameter |
| Intercept | Boolean | {0, 1} | Indicator of inclusion of intercept |
| $iS_p$ | Discrete | $[0, 2^9] \cap Z$ | Index of element in P[p] |
| d | Discrete | $[0, 2] \cap Z$ | Degree of non-seasonal differencing |
| $iS_q$ | Discrete | $[0, 2^9] \cap Z$ | Index of element in P[q] |
| $iS_P$ | Discrete | $[0, 2^3] \cap Z$ | Index of element in P[P] |
| D | Discrete | $[0, 2] \cap Z$ | Degree of seasonal differencing |
| $iS_Q$ | Discrete | $[0, 2^3] \cap Z$ | Index of element in P[Q] |

In Table 2 above, the column labeled "Hyperparameter" lists the variable that is used to represent a particular hyperparameter and the column labeled "type" indicates whether that hyperparameter is a continuous value, a discrete value, or a Boolean value. The column labeled "Range" indicates the value range that a particular hyperparameter may have. The optimal value of a hyperparameter may lie within that range. In some embodiments, the range, as well as an optimal value of each hyperparameter may be dependent on the search method used for tuning the hyperparameter. The column labeled "Details" provides a brief definition of the associated hyperparameter. The hyperparameter P[p] represents the power set of $\{1, 2, \ldots, p\}$, P[q] represents the power set of $\{1, 2, \ldots q\}$, P[Q] represents the power set of $\{1, 2, \ldots Q\}$, P[Q] represents the power set of $\{1, 2, \ldots P\}$, $iS_p$ represents the search space for the indices in P[p](e.g., the decimal representation of the binary number created by concatenating the indicators of the lags to be included in the subset ARIMA model). For example, suppose $iS_p$ is 27. Since 27 is 11011 in binary, thus the non-seasonal AR part of the ARIMA model may be (1, 2, 4, 5) (e.g., the first, second, fourth and fifth lag). This representation is interpretable because of the direct connection between decimal and binary representation of lags. This representation of the power set only needs to be calculated once at the beginning of the tuning process. Similarly, parameters $iS_q$, $iS_P$ and $iS_Q$ represent the search space for the indices in P[q], P[P], and P[Q], respectively, for the non-seasonal MA term, seasonal AR term, and seasonal MA term of the subset ARIMA model respectively.

Figure 16:
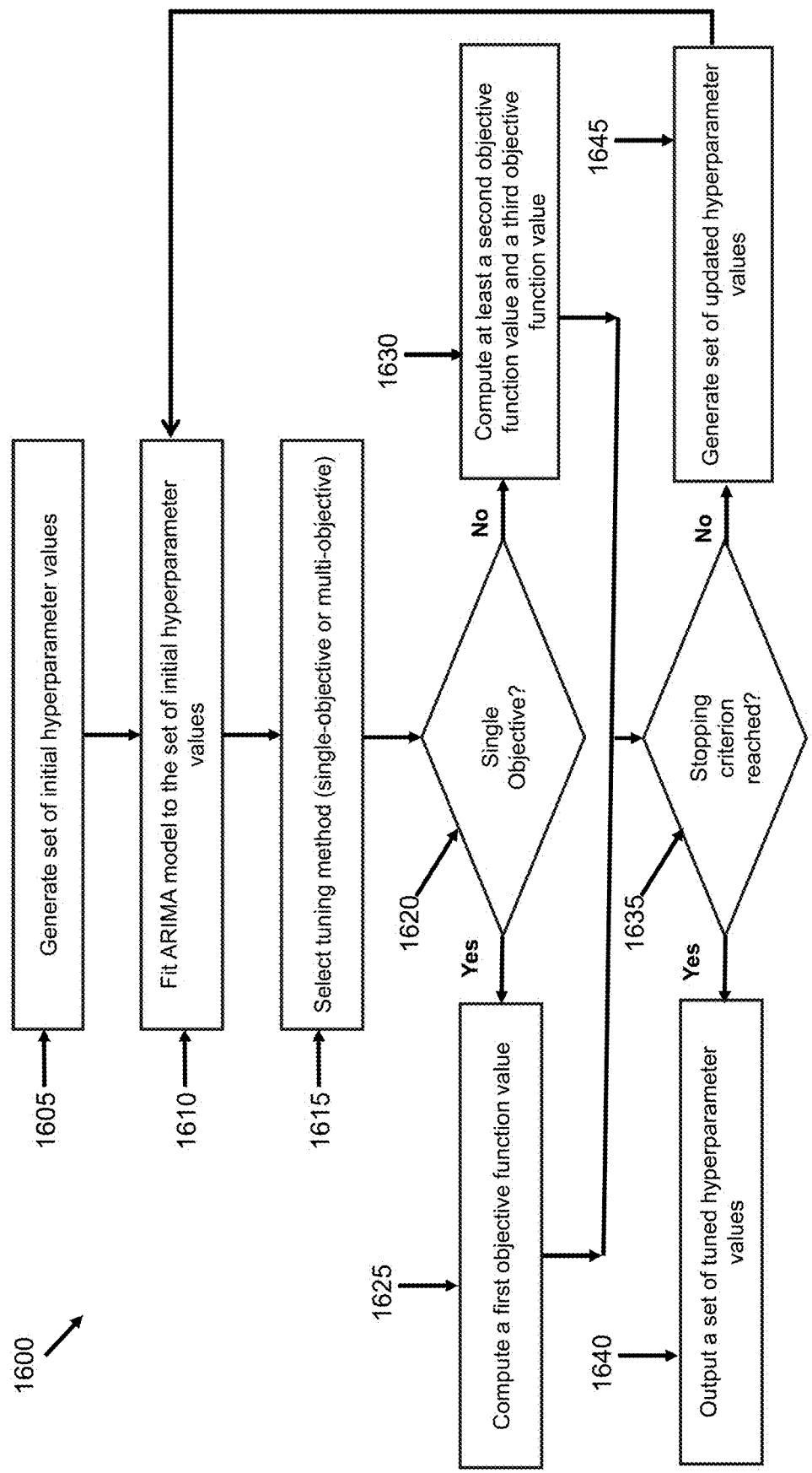
FIG. 16 is a flowchart outlining operations of an example process for tuning the values of the hyperparameters using the framework of FIG. 15, according to embodiments of the present technology.

Referring now to FIG. 16, an example flowchart outlining operations of a process 1600 is shown, in accordance with some embodiments of the present disclosure. The process 1600 may be executed by one or more processors (e.g., the processor 1430) executing computer-readable instructions (e.g., the hyperparameter tuning computer-readable instructions 1445) associated with the hyperparameter tuning application 1435. The process 1600 may be used for tuning the hyperparameters of the ARIMA model. The process 1600 may be used for tuning the hyperparameters for the full ARIMA model, as well as the subset ARIMA model. The process 1600 may also be used for tuning the hyperparameters of both seasonal and non-seasonal full and subset ARIMA models. The process 1600 may be used to tune the Box-Cox hyperparameter and the intercept hyperparameter along with the other hyperparameters of the various ARIMA models. The process 1600 provides a derivative-free approach to tuning the hyperparameters of the ARIMA model. The term "ARIMA model" used below generally refers to any of the full non seasonal ARIMA model, full seasonal ARIMA model, subset non seasonal ARIMA model, and the subset seasonal ARIMA model for which the hyperparameters are being tuned.

At operation 1605, the processor determines an initial hyperparameter value for each hyperparameter in a set of hyperparameters to be tuned to generate a set of initial hyperparameter values. For example, for a full seasonal ARIMA model, the processor may determine the initial hyperparameter value of one or more of the hyperparameters listed in Table 1 above (which form the set of hyperparameters). For a full non-seasonal ARIMA model, the processor may determine the initial hyperparameter value of the set of hyperparameters including one or more of the Box-Cox parameter, the intercept, non-seasonal autoregressive order, degree of non-seasonal differencing order, and non-seasonal moving average order. For a subset seasonal ARIMA model, the processor may determine the initial hyperparameter value of one or more of the hyperparameters listed in Table 2 above (which form the set of hyperparameters). For a subset non-seasonal ARIMA model, the processor may determine the initial hyperparameter value of the set of hyperparameters including one or more of the Box-Cox parameter, the intercept, the index of element in power set P[p] of the non-seasonal differencing order p, and index of element in power set P[q] of the non-seasonal moving average order q.

As discussed above with respect to Table 1 and Table 2, each hyperparameter may have a value range. In some embodiments, the processor may receive the value range of each hyperparameter in the set of hyperparameters and select a value from the value range of each hyperparameter as the initial hyperparameter value for that hyperparameter. In some embodiments, the processor may select a random value from the value range as the initial hyperparameter value. In other embodiments, the processor may select a value in the middle of the value range as the initial hyperparameter value. In yet other embodiments, the processor may select a value at another location of the value range as the initial hyperparameter value. In some embodiments, the search manager 1505 may retrieve the value range from the database 1525. In other embodiments, the search manager 1505 may retrieve the value range from other locations, including receiving the value range as input from a user.

At operation 1610, the processor fits the ARIMA model to the set of hyperparameter values (whether initial or updated). Fitting the ARIMA model refers to estimating (e.g., via least squares method) values of the parameters (e.g., coefficients of the polynomials Φ and Θ from Equations 2-4). At operation 1615, the processor selects a tuning method for the set of hyperparameters for which the initial hyperparameter values are selected at the operation 1605. In some embodiments, the tuning method may include either a single-objective method (DFO-S) or a multi-objective method (DFO-M). In some embodiments, each of the single-objective method and the multi-objective method may be associated with one or more objective functions. An objective function is a mathematical function that sets the objective of a program (e.g., an optimization program) and quantifies the discrepancy between a predicted output and an expected or actual output.

In some embodiments, the single-objective method may include computing the value of at least one objective function. In some embodiments, the multi-objective method may include computing values of at least two different objective functions. Depending upon whether the objective function is desired to be minimized (or maximized) and the number of objective function values that are desired for tuning the hyperparameters, the single-objective method or the multi-objective method may be selected. In some embodiments, the tuning method may be provided by a user as an input into the process 1600. In other embodiments, the processor may be preprogrammed to select either the single-objective method or the multi-objective method (e.g., if the user does not specify the tuning method). In some embodiments, the processor may be programmed with one or more criterion to select the single-objective method or the multi-objective method without requiring any user input.

Thus, at the operation 1615, the processor determines the tuning method: either the single-objective method that computes the value of a single objective function or a multi-objective method that computes the values of at least two different objective functions.

At operation 1620, the processor determines if the single-objective method is selected at the operation 1615. If so, at operation 1625, the processor computes a first objective function value from time series data applied to the ARIMA model based on the set of initial hyperparameter values of the operation 1605. In particular, in some embodiments, the search manager 1505 may send the fitted ARIMA model from the operation 1610 to the model evaluator 1515 that may compute the first objective function value. In some embodiments, the time series data may be provided as input by a user. In some embodiments, the user may provide a location of where the time series is stored and the processor (e.g., the search manager 1515, the model evaluator 151, etc.) may retrieve the time series data from that location. In other embodiments, the processor may receive the time series data in other ways. The hyperparameters may be tuned for the time series data. In other words, each time a different time series data is used, the process 1600 may be executed to tune the hyperparameters for that time series data. The processor may compute the first objective function value by computing a first function value from in-sample data selected from the time-series data or by computing a second function value from holdout data selected from the time-series data.

Time series data may generally be divided into two parts: training data and validation or testing data. The training data is data that may be used to train the ARIMA model and tune the hyperparameters on. The validation or testing data is data that is not used for training the ARIMA model or for tuning the hyperparameters, but rather used to test the ARIMA model after training. The validation or testing data is considered holdout data. The training data that is used to train the ARIMA model and tune the hyperparameters is called in-sample data. The in-sample data and the holdout data are known at the time of training the ARIMA model and tuning the hyperparameters. The trained ARIMA model having the tuned hyperparameters may be used to predict or forecast future data. Out-of-sample data may be used to test the ARIMA model's ability to accurately tune hyperparameters on unseen, new data. The out-of-sample data is, thus, the unseen data that is not known at the time of training the ARIMA model and tuning the hyperparameters.

The single-objective method includes computing the objective function value (e.g., the first objective function value) of a single objective function. This first objective function value may be computed from either in-sample data (e.g., the first function value) or from holdout data (e.g., the second function value). In some embodiments, the first function value may include a small-sample corrected Akaike's Information Criterion (AICc) value. Thus, the AICc value may be computed from the in-sample data of the time series data. In some embodiments, the second function value may include a Root Mean Square Error (RMSE) value. Thus, the RMSE value may be computed from the holdout data of the time series data. In other embodiments, based on user preference, other objective functions such as Mean Absolute Error, Total sum of Squares, Sum of Square Errors, Mean Absolute Error, Minimum Absolute Percentage Error, Maximum Absolute Percentage Error, Mean Absolute Percentage Error, Median Absolute Percentage Error, Geometric Mean Absolute Percentage Error, Relative Absolute Error, or other suitable statistics of fit objective functions may be used for either the first function value or the second function value.

When AICc is used as the objective function for computing the first function value, in some embodiments, the first function value may be computed as follows:

$$AICc = n\ln(SSE/n) + 2k + \{(2k(k+1))/(n-k-1)\} \quad \text{Equation 5}$$

In the Equation 5 above, n is the number of non-missing observations (e.g., observations that are observed and/or reported) in the in-sample data of the time series data, k is the number of fitted parameters (e.g., number of coefficients of the polynomials from Equations 2-4) in the ARIMA model, and SSE is the Sum of Square Errors computed as:

$$SSE = \sum_{f=1}^{n}(y_t - \hat{y}_t)^2 \quad \text{Equation 6}$$

In the Equation 6 above, $y_t$ is the observed value of the time series at time t, t is the predicted value.

When RMSE is used as the objective function for computing the first objective function value, in some embodiments, the second function value may be computed from holdout data as follows:

$$RMSE = \text{Square Root of MSE (Mean Square Error)} \quad \text{Equation 7}$$

Where $$MSE = (1/n)SSE \quad \text{Equation 8}$$

On the other hand, if at the operation 1620, the processor determines that the multi-objective method is selected at the operation 1615, the process 1600 proceeds to operation 1630 where the processor computes at least a second objective function value and a third objective function value from the time series data applied to the ARIMA model based on the set of initial hyperparameter values of the operation 1605. By computing values of at least three different objective functions, the multi-objective method may prevent overfitting, ensure model residuals are white noise, and make results interpretable.

In some embodiments, the multi-objective method may include a first multi-objective method (DFO-M1) or a second multi-objective method (DFO-M2). In some embodiments, each of the first multi-objective method and the second multi-objective method may include the second objective function value, the third objective function value, and a fourth objective function value. Thus, each of the first multi-objective method and the second multi-objective method may include computing values of at least three different objective functions. In some embodiments, at least one of the three objective functions may be different between the first multi-objective method and the second multi-objective method. For example, in some embodiments, both the first multi-objective method and the second multi-objective method may include the same second objective function value and the third objective function value, and a different fourth objective function value. In other words, each of the first multi-objective method and the second multi-objective method may compute values of three objective functions, two of which may be the same between the first multi-objective method and the second multi-objective method.

In some embodiments, the processor may compute the second objective function value for either the first multi-objective method or the second multi-objective method by computing a first function value on holdout data selected from the time series data. In some embodiments, the first function value of the operation 1630 may be an RMSE value computed from the holdout data of the time series data. The RMSE value may be computed as discussed above in Equations 7 and 8 above.

In some embodiments, the processor may compute the third objective function value for either the first multi-objective method or the second multi-objective method by computing a Model Residual Validity (MRV) score. At every iteration of tuning the hyperparameters (e.g., each iteration of executing the process 1600), the ARIMA model is fitted at the operation 1610 based on the initial hyperparameters values of the hyperparameters that are under consideration for that iteration. However, any combination of hyperparameters (even if they fall in the search space) may not lead to a valid ARIMA model. The forecast errors corresponding to a fitted model need to be white noise, hence that particular choice of hyperparameters may be penalized. In particular, the ARIMA model may have specific requirements that need to be satisfied for the ARIMA model to be deemed 'valid'. The main requirement is that the model residuals (e.g., the difference between the observed value and the value predicted by the ARIMA model) be white noise. This means that for a given combination of hyperparameters, even if the combination lies in the search space, the corresponding ARIMA model may not be valid if the model residuals aren't approximately white noise. White noise may be a random noise signal which follows a Gaussian distribution with zero mean and constant variance.

The MRV score may measure how close an array of model residuals of the ARIMA model are to white noise. Model residual at a particular point may refer to the difference between the observed value at that point, and the value predicted by the ARIMA model at the same point. Mathematically, at a point t, the model residual $r_t = y_t - \hat{y}_t$, where $y_t$ is the dependent variable at time t, while ŷt is the corresponding estimate generated by the model.

In some embodiments, the MRV may be computed as:

$$MRV = (|U_{acf}| + |U_{pacf}| + |U_{wn}|)/3n \qquad \text{Equation 9}$$

where $U_{acf} = \{1 \le i \le n | ACF(i) \ge tol_1 \times (\text{standard error of ACF(i)})\}$ $U_{pacf} = \{1 \le i \le n | PACF(i) \ge tol_2 \times (\text{standard error of PACF(i)})\}$ $U_{wn} = \{1 \le i \le n | WNP(i) \ge tol_3\}$, where $tol_1$, $tol_2$, $tol_3$ are predetermined threshold values, n is the number of lags. If r denotes the time series of model residuals, then ACF(i) denotes the value of the auto-correlation function of r at lag i, PACF(i) denotes the value of the partial auto-correlation function of r at lag i, and WNP(i) is the value of the white noise probability function of r at lag i.

|Uacf| determines how many times ACF exceeds the predetermined threshold value $tol_1$, |Upacf| determines how many times PACF exceeds the predetermined threshold value $tol_2$, and |Uwn| determines how many times white noise probability (WNP) exceeds the predetermined threshold value $tol_3$. Lower values of MRV are desirable. Lower the MRV, closer the residuals are to white noise.

Thus, in some embodiments, the processor may compute both the second objective function value (e.g., RMSE from the holdout data of the time series data) and the third objective function value (e.g., the MRV score) for both the first multi-objective method and the second multi-objective method. The fourth objective function value may be different for both the first multi-objective method and the second multi-objective method.

In some embodiments, the processor may compute the fourth objective function value for the first multi-objective method by computing a complexity value indicating a number of parameters (e.g. coefficients of polynomials) to estimate for the ARIMA model. In some embodiments, regularization may be desired to be added to the ARIMA model so that the ARIMA model performs well on unseen data (e.g., out-of-sample data) as well. Regularization is a process in statistics and machine learning, which encourages a model to learn simpler and more general patterns from data. Regularization may be used to prevent overfitting, which occurs when a model learns not only the underlying patterns in the training data but also the noise or random fluctuations, resulting in poor generalization to new, unseen data. Regularization discourages the model from fitting the noise. Computing the complexity value may be one mechanism to add regularization. For example, in some embodiments, less complex ARIMA models may be preferred. The ARIMA model may be considered less complex if the model has small values of the seasonal and the non-seasonal orders, which may make the ARIMA model more interpretable. The small values may be values that are below a predefined threshold. In some embodiments, regularization to the ARIMA model may be added by regulating the ARIMA model's performance on the training and holdout data of the time series to ensure that the performance extends to the test set as well.

When the complexity value is used to regularize the ARIMA model, in the absence of the intercept parameter, the complexity value for a full ARIMA model may be computed as:

$$p+q+P+Q \qquad \text{Equation 10}$$

where p is a non-seasonal autoregressive order, q is a non-seasonal moving average order, P is a seasonal autoregressive order, Q is a seasonal moving average order. The complexity value for a subset ARIMA model in the absence of the intercept parameter may be computed as:

$$|S_p|+|S_q|+|S_P|+|S_Q| \qquad \text{Equation 11}$$

where $S_p$, $S_P$, $S_q$, and $S_Q$ are the cardinalities of the subsets of non-seasonal AR orders, seasonal AR orders, non-seasonal MA orders, and seasonal MA orders, respectively, in the subset ARIMA model. If the intercept parameter is present, "1" is added to the computed complexity value above of Equations 10 and 11.

In some embodiments, the processor may compute the fourth objective function value for the second multi-objective method by computing a second function value from in-sample data selected from the time-series data. In some embodiments, the second function value may be a small-sample corrected Akaike's information criterion (AICc) value, computed using Equations 5 and 6.

In other embodiments, other objective functions may be used for either or both of the first multi-objective method and the second multi-objective method.

Responsive to computing either the first objective function value at the operation 1625 or computing at least the second objective function value and the third objective function value at the operation 1630, the process 1600 proceeds to operation 1635 where the processor determines whether a stopping criterion for tuning the set of hyperparameters has reached. The stopping criterion determines when the tuning of the hyperparameters may be stopped. In some embodiments, the stopping criterion may be preprogrammed within the processor. In some embodiments, the stopping criterion may include a number of iterations. For example, after executing the process 1600 for the number of iterations, the stopping criterion may be considered to have reached. In some embodiments, the stopping criterion may be an amount of time. Thus, in such embodiments, after executing the iterations of the process 1600 for the amount of time, the stopping criterion may be considered to have reached. In some embodiments, the stopping criterion may be the values of one or more of the hyperparameters being tuned. For example, in some embodiments, if the value of one or more of the designated hyperparameters is within a predefined threshold value or percentage, the stopping criterion may be considered to have reached. In other embodiments, other or additional stopping criterion may be used.

If the processor determines that the stopping criterion is reached at the operation 1635, at operation 1640, the processor outputs a set of tuned hyperparameter values including a tuned hyperparameter value for each hyperparameter in the set of hyperparameters whose initial value was set at the operation 1605. In some embodiments, responsive to determining that the single-objective method was selected at the operation 1620, the processor outputs the set of updated hyperparameter values corresponding to a lowest first objective function value as the set of tuned hyperparameter values from all the iterations. For example, in some embodiments, the processor may store the computed first objective function value after each iteration. As an example, the search manager 1505 may receive the computed first objective function value from the model evaluator 1515 in each iteration. The search manager 1505 may store the first objective function value in the database 1520 or the database 1525. When the stopping criterion is reached, the search manager 1505 may retrieve the computed first objective function values from each iteration. After the stopping criterion is reached, the processor (e.g., the search manager 1505) may compare all of the computed first objective function values and determine the lowest value of the first objective function value. The hyperparameter values corresponding to this lowest value may be output as the tuned hyperparameter values. Thus, for the single-objective method, the process 1600 computes multiple first objective function values and determines the lowest value after the stopping criterion is reached. There is no determination of any direction directive or step size directive that is made. Rather, the tuning process is governed by varying the initial values of the hyperparameters.

Responsive to determining that the first or second multi-objective method was selected at the operation 1620, the processor outputs the set of updated hyperparameter values based on the second objective function value, the third objective function value, and/or the fourth objective function value as the set of tuned hyperparameter values, as discussed in more detail below. Thus, for the first or second multi-objective method, the process 1600 computes multiple second, third, and fourth objective function values and determines the set of updated hyperparameter values after the stopping criterion is reached. There is no determination of any direction directive or step size directive that is made. Rather, the tuning process is governed by varying the initial values of the hyperparameters.

On the other hand, responsive to determining that the stopping criterion has not reached at the operation 1635, the process 1600 proceeds to operation 1645. At the operation 1645, the processor updates the initial hyperparameter value set at the operation 1605 for each hyperparameter in the set of hyperparameters to an updated hyperparameter value to generate a set of updated hyperparameter values. To generate the set of updated hyperparameter values, in some embodiments, the processor selects another value from the value range of each hyperparameter as the updated hyperparameter value for that hyperparameter. The process 1600 then returns to the operation 1610 where the operations 1615-1645 are repeated but with the set of updated hyperparameter values instead of the set of initial hyperparameter values.

Figure 17:
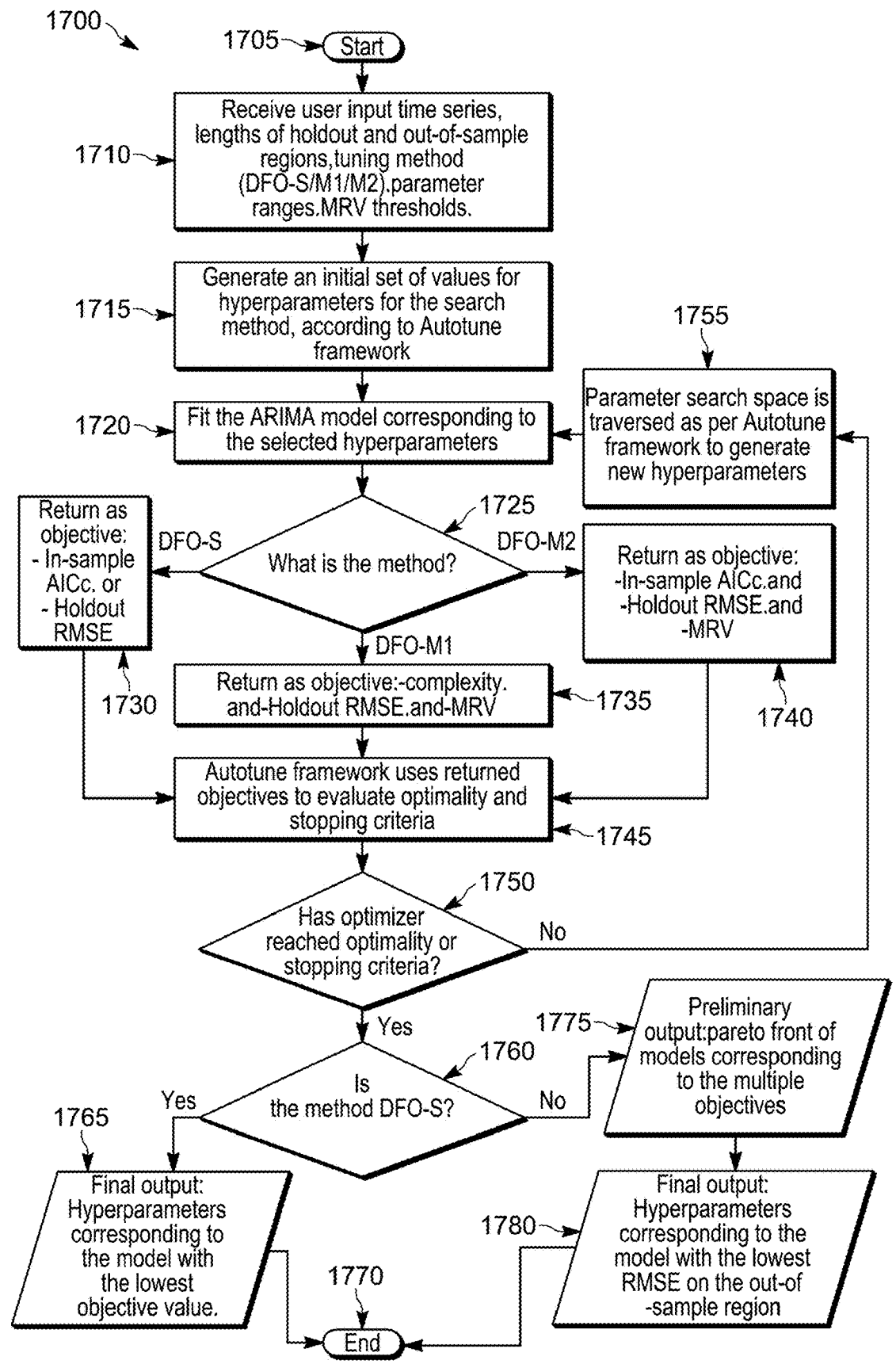
FIG. 17 is a flowchart showing the example process of FIG. 16 in greater detail, according to embodiments of the present technology.

Referring now to FIG. 17, an example flowchart outlining operations of a process 1700 is shown, in accordance with some embodiments of the present disclosure. The process 1700 may be executed by one or more processors (e.g., the processor 1430) executing computer-readable instructions (e.g., the hyperparameter tuning computer-readable instructions 1445) associated with the hyperparameter tuning application 1435. The process 1700 may be used for tuning the hyperparameters of the ARIMA model. The process 1700 may be used for tuning the hyperparameters for the full ARIMA model, as well as the subset ARIMA model. The process 1700 may also be used for tuning the hyperparameters of both seasonal and non-seasonal full and subset ARIMA models. The process 1700 describes the process 1600 in greater detail.

Thus, after starting at operation 1705, the processor receives one or more inputs at operation 1710. For example, in some embodiments, the search manager 1505 may receive the user inputs. In some embodiments, the one or more inputs may include the time series data for which the hyperparameters are to be tuned, identification of a length or portion or region of the time series data to be used for out-of-sample data and holdout data (with the remaining being used for in-sample data), the tuning method to be used (e.g., single objective, first multi-objective, second multi-objective), and the thresholds (e.g., $tol_1$, $tol_2$, $tol_3$) to be used for computing the MRV score. In some embodiments, the one or more inputs may also identify the hyperparameters to be tuned and/or the search method 1530 to be used for tuning the hyperparameters. In other embodiments, the one or more inputs may include other or additional values that may be needed or considered desirable for the processor to have in executing the process 1700.

At operation 1715, the processor generates a set of initial hyperparameter values for the hyperparameters to be tuned for the search method that is to be used for tuning the hyperparameters. The operation 1715 is analogous to the operation 1605. At operation 1720, the processor fits the ARIMA model to the set of initial hyperparameter values set at the operation 1715. The operation 1720 is analogous to the operation 1610. At operation 1725, the processor determines the tuning method, similar to the operation 1615. If the selected tuning method is a single objective method (DFO-S), the process 1700 proceeds to operation 1730. If the selected tuning method is the first multi-objective method, the process 1700 proceeds to operation 1735. If the selected tuning method is the second multi-objective method, the process 1700 proceeds to operation 1740.

At the operation 1730, the processor computes the first objective function value from either in-sample data (e.g., the first function value) or from holdout data (e.g., the second function value). In some embodiments, the first function value may include an AICc value computed from the in-sample data of the time series data. In some embodiments, the second function value may include an RMSE value computed from the holdout data portion of the time series data, as discussed above at the operation 1625. At operation 1735, the processor computes the second objective function value, the third objective function value, and the fourth objective function value from the time series data, as discussed above at the operation 1630 for the first multi-objective method. In some embodiments, the second objective function value may be the RMSE value computed from the holdout data of the time series data. In some embodiments, the third objective function value may be the MRV score. In some embodiments, the fourth objective function value may be the complexity value. At the operation 1740, the processor computes the second objective function value, the third objective function value, and the fourth objective function value from the time series data, as discussed above at the operation 1630 for the second multi-objective method. In some embodiments, the second objective function value may be the RMSE value computed from the holdout data of the time series data. In some embodiments, the third objective function value may be the MRV score. In some embodiments, the fourth objective function value may be the AICc value computed from the in-sample time series data.

Responsive to computing the various objective function values, at operation 1745, the processor evaluates the computed objective function values and determines the stopping criterion. In some embodiments, a different stopping criterion may be used for the single objective method and the multi-objective method. In some embodiments, a different stopping criterion may be used for the first multi-objective method than the second multi-objective method. If the process 1745 is reached from the operation 1730, the processor may evaluate the first objective function value computed at the operation 1730 and determine the stopping criterion for the single objective method. If the process 1745 is reached from the operation 1735, the processor may evaluate the second objective function value, the third objective function value, and the fourth objective function value, and determine the stopping criterion for the first multi-objective method. If the process 1745 is reached from the operation 1740, the processor may evaluate the second objective function value, the third objective function value, and the fourth objective function value, and determine the stopping criterion for the second multi-objective method.

At operation 1750, the processor determines if the stopping criterion for the selected tuning method is reached similar to the operation 1635. If the stopping criterion is reached, the process 1700 proceeds to operation 1760. Otherwise, the process 1700 proceeds to operation 1755 where the processor generates a set of updated hyperparameter values and returns to the operation 1720 for the next iteration. The operation 1755 is analogous to the operation 1645.

At operation 1760, the processor determines if the tuning method selected at the operation 1725 was a single objective method. If so, at operation 1765, the processor outputs the final output: the set of tuned hyperparameters corresponding to the lowest value of the first objective function value, as discussed above at the operation 1640. The process 1700 then ends at operation 1770. If either the first multi-objective method or the second multi-objective method was selected at the operation 1725, the processor proceeds to operation 1775 at which the processor generates a preliminary output based on the second objective function value, the third objective function value, and the fourth objective function value. In particular, in some embodiments, the processor generates a set of Pareto front outputs based on the second objective function value, the third objective function value, and the fourth objective function value as the preliminary output.

Figure 18:
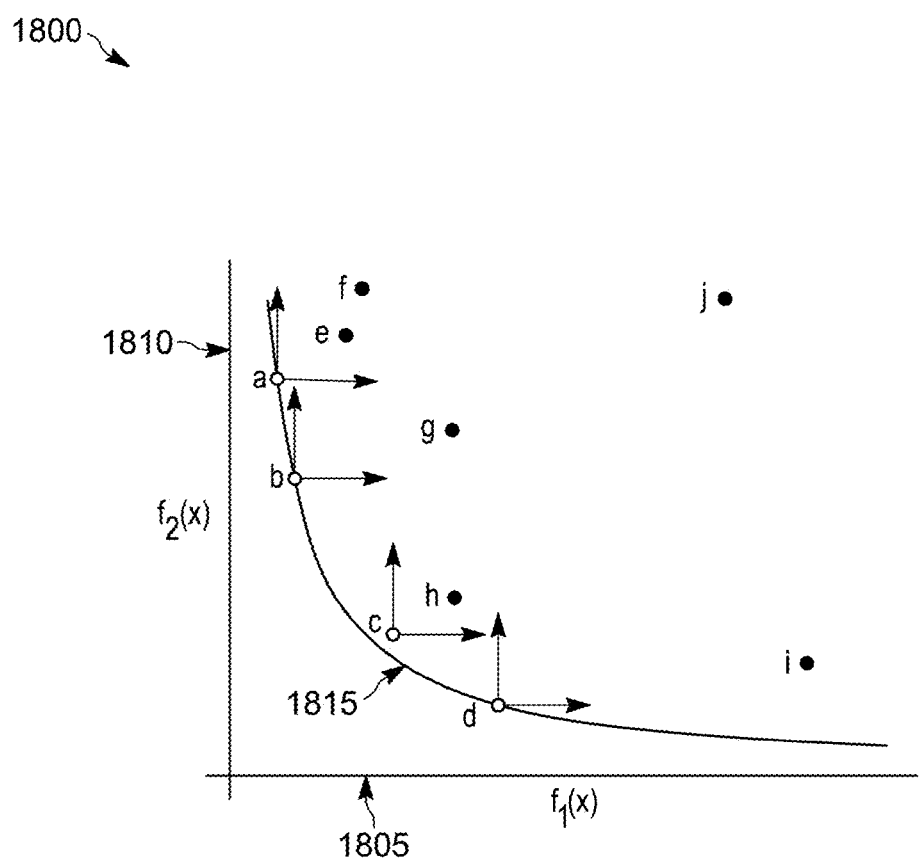
FIG. 18 is an example of a Pareto front used during the processes of FIGS. 16 and 17, according to embodiments of the present technology.

Mathematically, the first multi-objective method and the second multi-objective method may be described in terms of dominance and Pareto optimality. For a k-objective minimization problem, a point x in the optimization landscape is said to be dominated by a point y if $f_i(x) \geq f_i(y)$ for all $i \in \{1, \ldots, k\}$ and $f_j(x) > f_j(y)$ for some $j \in \{1, \ldots, k\}$, where $\{f_j\}$ is the set of objectives. A set of nondominated solutions is known as a Pareto front. For example and referring to FIG. 18 in conjunction with FIG. 17, an example graph 1800 is shown in accordance with some embodiments of the present disclosure. The graph 1800 shows a Pareto front with respect to objective functions $f_1$ and $f_2$ of data x, alongside a corresponding population of 10 points (a, b, c, d, e, f, g, h, i, j—values of x) that are plotted in the optimization landscape. The graph 1800 plots the objective function $f_1$ along X-axis 1805 against objective function $f_2$ that is plotted along Y-axis 1810. The graph 1800 shows a Pareto front 1815 such that point a dominates $\{e,f,j\}$, point b dominates $\{e,f,g,j\}$, point c dominates $\{g,h,j\}$, and point d dominates $\{i,j\}$. Point c has not converged to the true Pareto front and there exist points in a neighborhood of c with smaller values of $f_1$ and $f_2$ that have not been identified yet. However, c is still considered a part of the estimated Pareto front because no other point in the population of this example dominates c.

The Pareto front may be determined from the second objective function value, the third objective function value, and the fourth objective function value in any suitable way. In some embodiments, the Pareto front from the second objective function value, the third objective function value, and the fourth objective function value may be determined by creating a Latin Hypercube Sampling (LHS) of the search space, which may act as a starting point for a particular search method (e.g., the genetic algorithm) to search for candidate solutions and provides the Pareto front in a single run. In some embodiments, the processor may run local searches using a Generating Set Search (GSS) algorithm in neighborhoods around the nondominated points to improve the objective function values and reduce crowding distances. In some embodiments, convergence may be measured using a minor extension of the averaged Hausdorff distance.

Thus, at the operation 1775, the processor determines the set of Pareto front outputs for each of the second objective function value, the third objective function value, and the fourth objective function value. At operation 1780, the processor computes a third function value from out-of-sample data in the time-series data for each Pareto front output in the set of Pareto front outputs and selects the set of updated hyperparameter values corresponding to the Pareto front output having an optimal value of the third function value as the set of tuned hyperparameter values. In some embodiments, the optimal value may include either a highest value of the third function value or a lowest value of the third function value. In some embodiments, the third function value may be an RMSE value computed using Equations 7 and 8 above. In other embodiments, the third function value may be another type of statistical fit value. Responsive to outputting the hyperparameter values corresponding to the optimal third function value, the process 1700 ends at the operation 1770.

The processor may then use the tuned hyperparameter values to predict a future data point in the time-series data by applying the set of tuned hyperparameter values to the ARIMA model. In some embodiments, the processor may use parallel and distributed computing to determine the set of tuned hyperparameter values. In some embodiments, the parallel and distributed computing may include a plurality of worker machines that may be controlled by a main machine. Each worker machine may execute one or more computing sessions, and each of the one or more computing sessions may execute the operations 1705-1740. For example, in some embodiments, each worker machine may execute one iteration of the process 1700 using a particular set of initial hyperparameter values. The worker machine may send the computed objective function value for that iteration to the main machine. The main machine may cause the worker machines to continue running the iterations until the stopping criteria is reached. In some embodiments, the operations 1745-1780 may be run by the main machine. Each of the worker machines and the main machine may be similar to the computing system 1400. In some embodiments, the search manager 1505 may be implemented on the main machine and the model evaluator 1515 may be implemented on each worker machine. In other embodiments, other configurations may be used.

Turning now to FIGS. 19-22, example experimental results for four different time series datasets using the proposed derivative free approaches are shown, in accordance with some embodiments of the present disclosure. The experimental results compare the proposed approach (single-objective method, multi-objective method) with two conventional mechanisms for tuning hyperparameters in ARIMA models: Auto-ARIMA (R. J. Hyndman and Y. Khandakar. Automatic Time Series Forecasting: The forecast Package for R. Journal of Statistical Software, 27(2): 1-22, 2008) and SAS Diagnose available from the SAS Institute Inc. SAS® Visual Forecasting: Time Series Packages. Cary, NC: SAS Institute Inc, 2023. The results below use the objective function AICc for computing values in the in-sample data and RMSE for computing values in the holdout data. In each set of results, the same objective functions are used for all of the proposed approaches, auto-ARIMA, and SAS diagnose.

Auto-ARIMA is directed to finding the best ARIMA model by minimizing the AIC (Akaike Information Criterion) after considering different combinations of model parameters. SAS Diagnose provides a comprehensive set of tools for automated univariate time series data modeling. SAS Diagnose computes the statistical characteristics of time series and automatically identifies appropriate models from different time series family models including ARIMA, exponential smoothing model (ESM), unobserved components model (UCM) and intermittent demand model (DM).

Figure 19:
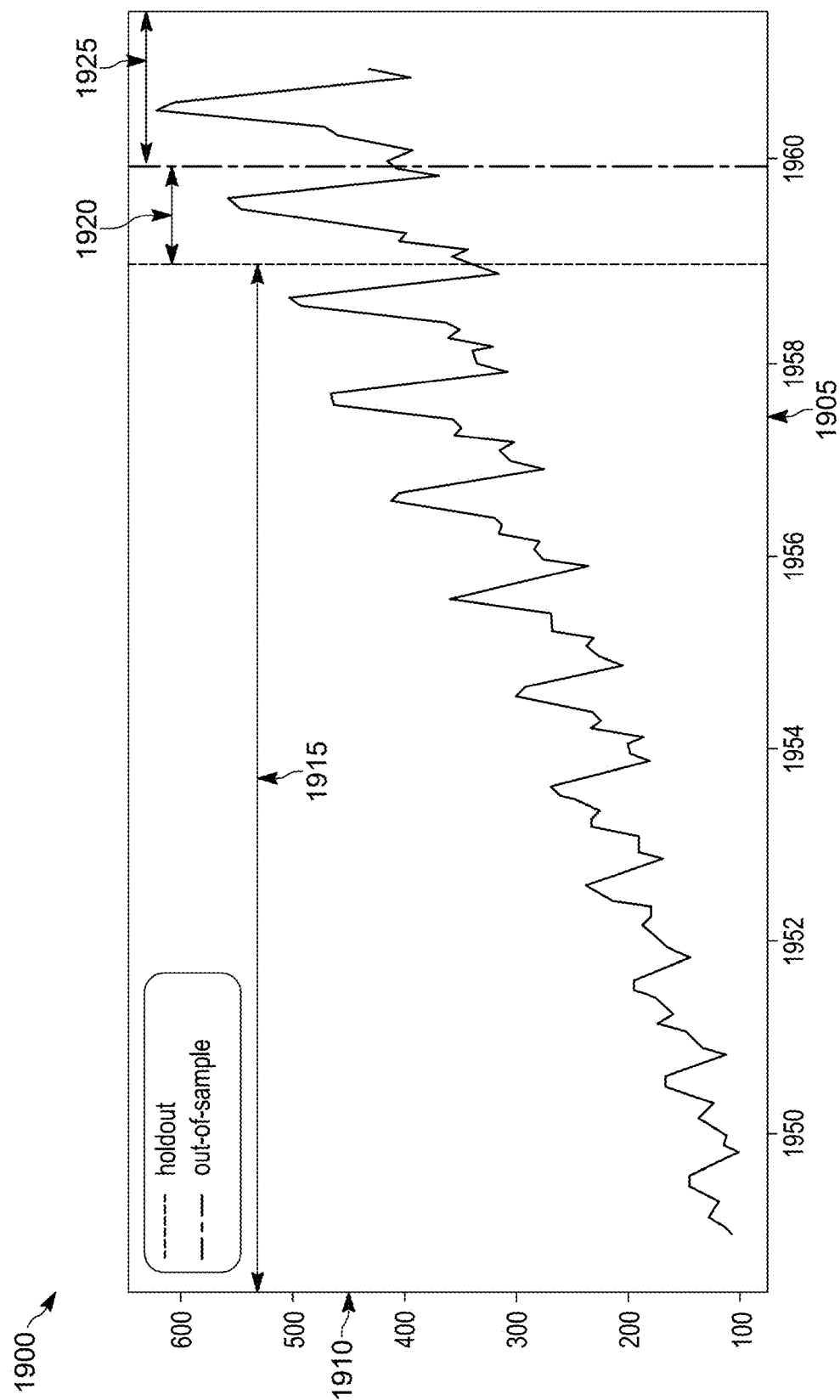
FIG. 19 is an example time series dataset for a first application, according to embodiments of the present technology.

Referring specifically to FIG. 19, a graph 1900 shows time series data corresponding to monthly number of airline passengers from January 1949 to December 1960 for a total of 144 entries. Thus, the graph 1900 plots the timeline on X-axis 1905 against the number of airline passengers on Y-Axis 1910. The time series data on the graph 1900 is divided into in-sample data 1915, holdout data 1920, and out-of-sample data 1925. The out-of-sample data 1925 is predicted using the in-sample data 1915 and the holdout data 1920. The out-of-sample data 1925 corresponds to a predicted number of airline passengers monthly after the year 1960. The holdout data 1920 is of length 12 (meaning of 12 months—1959-1960). The seasonality of the time series data shown in the graph 1900 is also 12 (e.g., a year).

Tables 3-6 below show the comparative results of tuning the hyperparameters of the ARIMA model using the proposed approach for the data shown in the graph 1900:

TABLE 3

| Parameter | DFO-S (Holdout) | DFO-S (In-samp) | DFO-M1 | DFO-M2 | auto-ARIMA (Holdout) | auto-ARIMA (In-samp) | SAS Diagnose (Holdout) | SAS Diagnose (In-samp) |
|---|---|---|---|---|---|---|---|---|
| Intercept | 1 | 0 | 0 | 1 | 1 | 1 | 0 | 0 |
| p | 0 | 1 | 1 | 0 | 0 | 3 | 1 | 1 |
| d | 0 | 1 | 0 | 0 | 0 | 0 | 1 | 1 |
| q | 3 | 0 | 1 | 9 | 1 | 0 | 0 | 0 |
| P | 3 | 0 | 1 | 0 | 0 | 0 | 0 | 0 |
| D | 2 | 2 | 2 | 2 | 1 | 1 | 1 | 1 |
| Q | 1 | 2 | 1 | 2 | 1 | 0 | 0 | 0 |
| Out-of-sample RMSE | 16.28 | 22.87 | 14.63 | 13.99 | 25.54 | 19.45 | 23.92 | 23.92 |

TABLE 4

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| λ | 1.35 | | 0.27 | 0.37 | | 1.27 |
| Intercept | 1 | 1 | 1 | 1 | 1 | 1 |
| p | 0 | ( ) | 0 | 7 | ( ) | ( ) |
| d | 0 | 0 | 2 | 0 | 0 | 0 |
| q | 1 | (1 2 5 9) | 9 | 7 | (1 2 9) | (1 2 3 4 5 9) |
| P | 0 | (1) | 3 | 3 | ( ) | (1 2 3) |

TABLE 4-continued

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| D | 2 | 2 | 1 | 1 | 2 | 2 |
| Q | 3 | (1 2) | ( ) | 0 | (1 2 3) | (1) |
| Out-of-sample RMSE | 13.60 | 13.16 | 15.52 | 13.32 | 13.44 | 14.52 |

TABLE 5

| In-sample | BoxCox | Subset Model? | Intercept included? | Final Orders | Estimated BoxCox parameter | Out-of-sample RMSE |
|---|---|---|---|---|---|---|
| False | False | False | Yes | (0, 0, 3) (3, 2, 1) | | 16.28 |
| False | False | True | Yes | (( ), 0, (2 3 7 8 9)) ((1 2 3), 2, (2)) | | 15.70 |
| False | True | False | Yes | (8, 0, 6) (3, 1, 0) | 0.1587 | 17.62 |
| False | True | True | Yes | ((2 8 9), 0, (4 7 9)) ((3), 1,(1)) | 0.1081 | 18.26 |
| True | False | False | No | (1, 1, 0) (0, 2, 2) | | 22.88 |
| True | False | True | No | ((1), 1, (1 4 9))(( ), 2, (1 2 3)) | | 24.07 |
| True | True | False | No | (1, 1, 0) (1, 2, 1) | 1.5328 | 20.20 |
| True | True | True | No | ((1 8), 1, (1 4))(( ), 2, (1 2)) | 1.508 | 21.96 |

TABLE 6

| Scenario | DFO-S (Holdout) | DFO-S (In-samp) | DFO-M1 | DFO-M2 | Brute Force |
|---|---|---|---|---|---|
| Box-Cox = F, Subset = F | 699 | 565 | 866 | 1007 | 28800 |
| Box-Cox = T, Subset = F | 5117 | 3102 | 7427 | 7375 | ∞ |
| Box-Cox = F, Subset = T | 1414 | 2156 | 2131 | 5345 | 383700402 |
| Box-Cox = T, Subset = T | 7516 | 7155 | 7373 | 7477 | ∞ |

Table 3 displays the results of the comparative study for general ARIMA models, in absence of Box-Cox transformation. As seen from the results of the out-of-sample data (last row), all of the proposed approaches (DFO-S, DFO-M1, DFO-M2) outperform the auto-ARIMA and SAS diagnose methods (e.g., because the out-of-sample computed values are lower than the corresponding values computed by auto-ARIMA and SAS diagnose). Of the three (DFO-S, DFO-M1, and DFO-M2) proposed approaches, DFO-M2 has the lowest value of the computed out-of-sample data suggesting that DFO-M2 may perform better in full ARIMA models when the Box-Cox transformation is not used.

Table 4 displays the results of the comparative study for subset ARIMA models for the DFO-M1 and DFO-M2 methods, as well as including the Box-Cox transformation. For example, Table 4 shows results for DFO-M1 when Box-Cox transformation is used (Box-Cox=True or T) and subset ARIMA model is not used (Subset=False or F), when Box-Cox transformation is not used (Box-Cox=F) and subset ARIMA model is used (Subset=T), and when Box-Cox transformation is used (Box-Cox=T) and subset ARIMA model is used (Subset=T). Table 4 also shows results for DFO-M2 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T).

As seen from Table 4, in presence of both Box-Cox transformations or subset ARIMA (e.g., when both Box-Cox=T or subset=T), but not both simultaneously (e.g. not when both Box-Cox=T and subset=T), the final models' out-of-sample RMSE in Table 4 are lower (e.g. 13.60, 13.16, 13.32, 13.44) than the best RMSE (e.g. 13.99) for the general ARIMA case in Table 3, suggesting that presence of either Box-Cox transformation or subset models, but not both, may provide better performance than full ARIMA models. Out of the various combinations shown in Table 4, the best performance (with out-of-sample error of 13.16) is obtained by DFO-M1 for a subset ARIMA model without any Box-Cox transformation.

Table 5 displays the results of the comparative study for subset ARIMA models for the DFO-S method, as well as including the Box-Cox transformation. For example, Table 5 shows results for DFO-S when Box-Cox transformation is used (Box-Cox=True) and subset ARIMA model is not used (Subset=False), when Box-Cox transformation is not used (Box-Cox=False) and subset ARIMA model is used (Subset=True), when Box-Cox transformation is used (Box-Cox=True) and subset ARIMA model is used (Subset=True), and when Box-Cox transformation is not used (Box-Cox=False) and subset ARIMA model is not used (Subset=False—that is, the full ARIMA model is used). Table 5 also shows results for when the intercept parameter is used (Yes) and when the intercept parameter is not used (No). Table 5 also shows results for when the in-sample data is used for computing the objective function (In-sample=True) and when holdout data is used for computing the objective function (In-sample=False). The results show that the best value (e.g., lowest value) of the out-of-sample data is received when holdout data is used for computing the objective function in a subset ARIMA model when the Box-Cox transformation is not used, and intercept is used.

Table 6 shows the number of iterations that it took using the proposed approaches to tune the hyperparameters versus number of iterations needed for tuning the same hyperparameters using a brute force (e.g., using a pen and paper) search. As seen from Table 6, the proposed approaches use significantly fewer iterations for each method than the brute force method. The brute approach is not able to generate any results (e.g., unable to tune the hyperparameters) when the Box-Cox is True.

Figure 20:
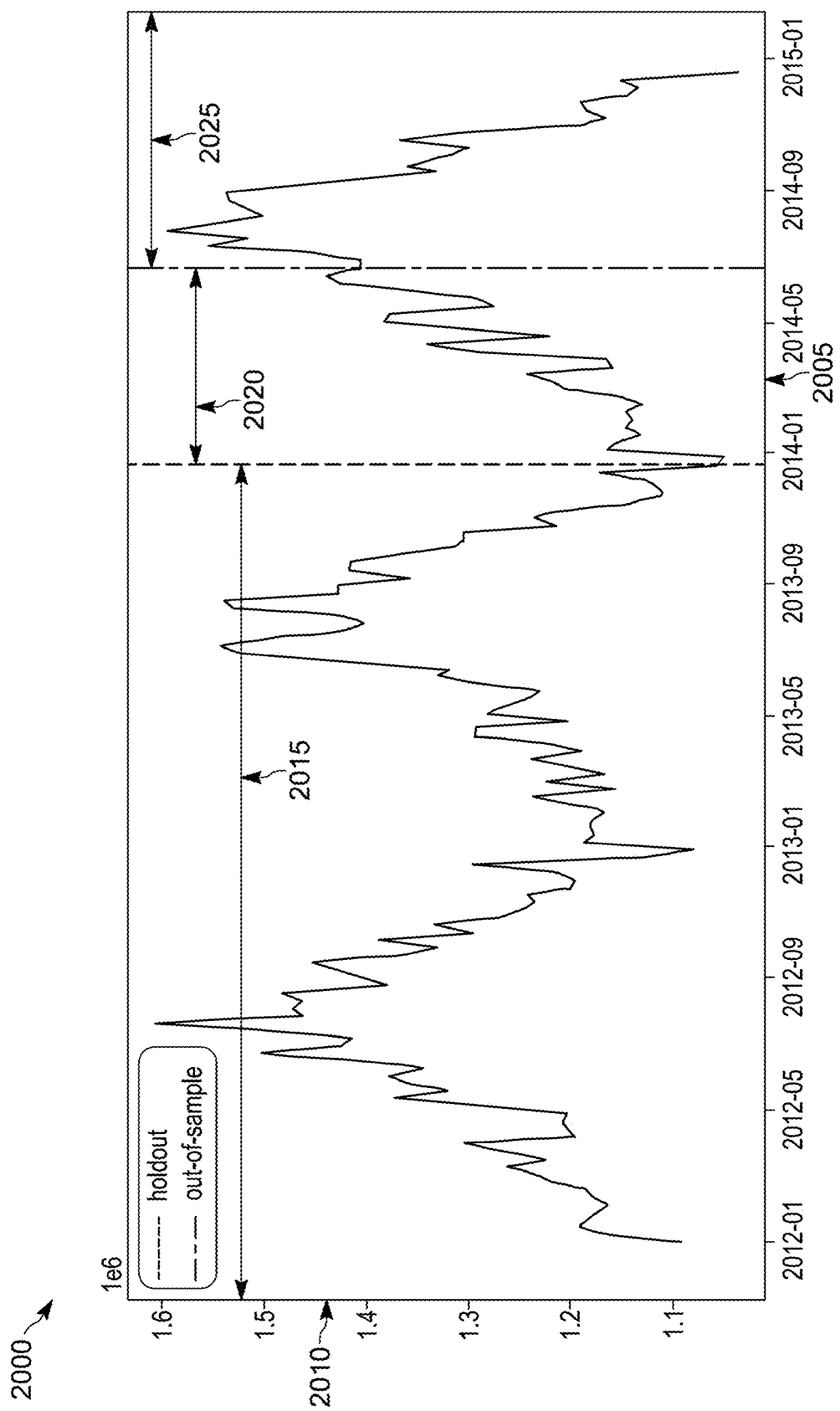
FIG. 20 is an example time series dataset for a second application, according to embodiments of the present technology.

Turning to FIG. 20, a graph 2000 shows time series data corresponding to weekly electricity consumption of 370 clients recorded in 15-minute time intervals in kilowatt (kW) from 2001 to 2014 for a total length of 156 time periods. Thus, the graph 2000 plots the timeline on X-axis 2005 against the electricity consumption on Y-Axis 2010. The time series data on the graph 2000 is divided into in-sample data 2015, holdout data 2020, and out-of-sample data 2025. The out-of-sample data 2025 is predicted using the in-sample data 2015 and the holdout data 2020. The out-of-sample data 2025 corresponds to a predicted electricity consumption in kWs for the year 2015. The in-sample data 2015 and the holdout data 2020 each is of length 26 (meaning of 26 time periods between 2011 and 2014). The seasonality of the time series data shown in the graph 2000 is 52 (e.g., one year).

Tables 7-9 below show the comparative results of tuning the hyperparameters of the ARIMA model using the proposed approaches for the time series data shown in the graph 2000:

TABLE 7

| Parameter | DFO-S (Holdout) | DFO-S (In-samp) | DFO-M1 | DFO-M2 | auto-ARIMA (Holdout) | auto-ARIMA (In-samp) | SAS Diagnose (Holdout) | SAS Diagnose (In-samp) |
|---|---|---|---|---|---|---|---|---|
| Intercept | 1 | 0 | 1 | 0 | 1 | 1 | 0 | 0 |
| p | 8 | 0 | 6 | 8 | 1 | 1 | 0 | 0 |
| d | 0 | 2 | 0 | 1 | 0 | 0 | 1 | 1 |
| q | 3 | 3 | 4 | 4 | 0 | 0 | 0 | 2 |
| P | 1 | 0 | 1 | 1 | 1 | 1 | 0 | 1 |
| D | 0 | 1 | 0 | 0 | 0 | 0 | 0 | 0 |
| Q | 0 | 0 | 0 | 0 | 0 | 0 | 0 | 0 |
| Out-of-sample RMSE | 7.169 | 7.569 | 7.043 | 6.644 | 11.839 | 11.839 | 16.774 | 12.719 |

TABLE 8

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| λ | 3.45 | | 0.26 | 1.01 | | 1.03 |
| Intercept | 1 | 1 | 1 | 0 | 0 | 0 |
| P | 7 | (1 2 6 9) | (3 4 5 6 7 8 9) | 7 | (1 2 4 5 8) | (1 3 6) |
| d | 0 | 0 | 0 | 1 | 1 | 1 |
| q | 3 | (2 3 5 6 9) | (3 4 8) | 6 | (1 2 3 4 6 7 9) | (1 3 4 5 6 7 8) |
| P | 0 | (1) | ( ) | 1 | (1) | (1) |
| D | 0 | 0 | 0 | 0 | 0 | 0 |
| Q | 1 | (1) | (1) | 0 | ( ) | ( ) |
| Out-of-sample RMSE | 6.230 | 6.841 | 6.857 | 6.823 | 6.619 | 6.738 |

TABLE 9

| In-sample | BoxCox | Subset model? | Intercept included? | Final Orders | Estimated BoxCox parameter | Out-of-sample RMSE |
|---|---|---|---|---|---|---|
| False | False | False | Yes | (8, 0, 3)(1, 0, 0) | | 7.169 |
| False | False | True | Yes | ((1 4 5 7 8 9), 0, (1 4 7 8 9))((1), 0, (1)) | | 15.955 |
| False | True | False | Yes | (8, 1, 7)(0, 0, 1) | 1.5772 | 17.855 |
| False | True | True | No | (( ), 2, (2 5 7 8))(( ), 1, ( )) | 4.0387 | 41.489 |
| True | False | False | No | (0, 2, 3)(0, 1, 0) | | 7.569 |
| True | False | True | No | ((1 2 9), 1, (2 4 6))(( ), 1, ( )) | | 8.065 |
| True | True | False | No | (0, 1, 3)(0, 1, 0) | −0.4403 | 8.410 |
| True | True | True | No | (( ), 3, ( ))(( ), 1, ( )) | 4.9584 | 33.451 |

Table 7 displays the results of the comparative study for full ARIMA models, in absence of Box-Cox transformation. For brevity of representation, the RMSE numbers in the last row have been scaled down by 10,000. As seen from results of the out-of-sample data (last row), all of the proposed approaches (DFO-S, DFO-M1, DFO-M2) outperform the auto-ARIMA and SAS diagnose methods (e.g., because the out-of-sample computed values are lower than the corresponding values computed by auto-ARIMA and SAS diagnose). Of the three (DFO-S, DFO-M1, and DFO-M2) proposed approaches. DFO-M2 has the lowest value of the computed out-of-sample data (e.g., the best RMSE).

Table 8 displays the results of the comparative study for subset ARIMA models for the DFO-M1 and DFO-M2 methods, as well as including the Box-Cox transformation. For brevity of representation, the RMSE numbers in the last row have been scaled down by 10,000. For example, Table 8 shows results for DFO-M1 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T). Table 8 also shows results for DFO-M2 for when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T).

Out of the various combinations shown in Table 8, the best performance (with out-of-sample error of 6.230) is obtained by DFO-M1 when subset ARIMA model is not used but Box-Cox transformation is used.

Table 9 displays the results of the comparative study for subset ARIMA models for the DFO-S method, as well as including the Box-Cox transformation. For example, Table 9 shows results for DFO-S when Box-Cox transformation is used (Box-Cox=True) and subset ARIMA model is not used (Subset=False), when Box-Cox transformation is not used (Box-Cox=False) and subset ARIMA model is used (Subset=True), when Box-Cox transformation is used (Box-Cox=True) and subset ARIMA model is used (Subset=True), and when Box-Cox transformation is not used (Box-Cox=False) and subset ARIMA model is not used (Subset=False). Table 9 also shows results for when the intercept parameter is used (Yes) and when the intercept parameter is not used (No). Table 9 also shows results for when the in-sample data is used for computing the objective function (in-sample=True) and when holdout data is used for computing the objective function (In-Sample=False). For brevity of representation, the RMSE numbers in the last column have been scaled down by 10,000. The results show that the best value (e.g., lowest value) of the out-of-sample RMSE is received when holdout data is used for computing the objective function in a full ARIMA model when the Box-Cox transformation is not used and intercept is used.

Figure 21:
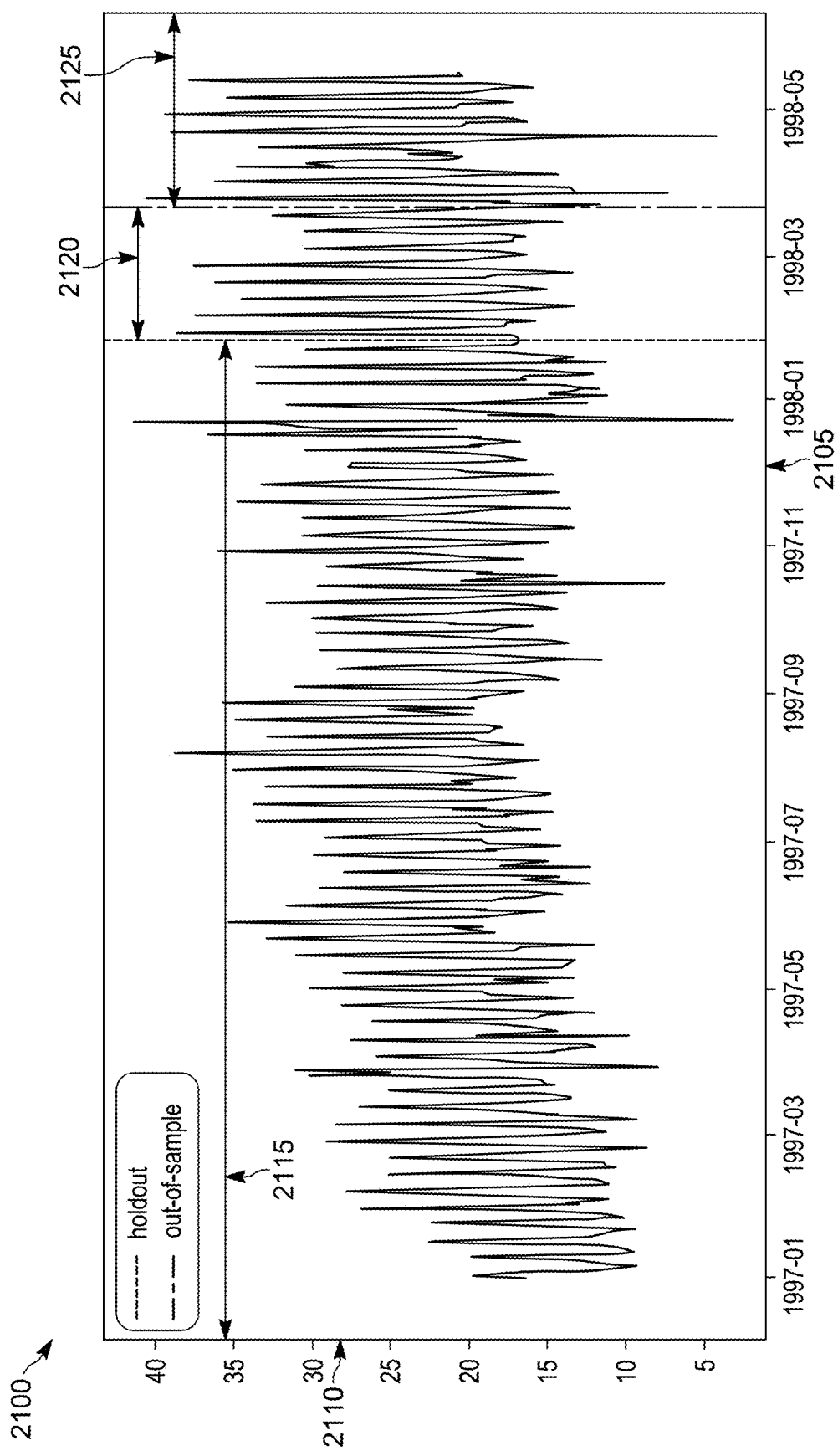
FIG. 21 is an example time series dataset for a third application, according to embodiments of the present technology.

Turning to FIG. 21, a graph 2100 shows time series data corresponding to daily cash withdrawals from ATMs in the United Kingdom from 1997 to part of 1998 for a total length of 502 time periods. Thus, the graph 2100 plots the timeline on X-axis 2105 against the number of cash withdrawals on Y-Axis 2110. The time series data on the graph 2100 is divided into in-sample data 2115, holdout data 2120, and out-of-sample data 2125. The out-of-sample data 2125 is predicted using the in-sample data 2115 and the holdout data 2120. The out-of-sample data 2125 corresponds to a predicted number of cash withdrawals for the portion of the remaining year 1998. The in-sample data 2115 and the holdout data 2120 each is of length 56 (meaning of 56 time periods). The seasonality of the time series data shown in the graph 2100 is 7 (e.g., a week).

Tables 10-12 below show the comparative results of tuning the hyperparameters of the ARIMA model using the proposed approaches for the time series data shown in the graph 2100:

TABLE 10

| Parameter | DFO-S (Holdout) | DFO-S (In-samp) | DFO-M1 | DFO-M2 | auto-ARIMA (Holdout) | auto-ARIMA (In-samp) | SAS Diagnose (Holdout) | SAS Diagnose (In-samp) |
|---|---|---|---|---|---|---|---|---|
| Intercept | 1 | 1 | 1 | 1 | 1 | 1 | 0 | 0 |
| p | 4 | 1 | 0 | 4 | 1 | 6 | 0 | 4 |
| d | 0 | 0 | 0 | 0 | 1 | 0 | 1 | 1 |
| q | 3 | 0 | 1 | 2 | 0 | 4 | 1 | 1 |
| P | 1 | 0 | 1 | 1 | 3 | 1 | 1 | 0 |
| D | 1 | 1 | 1 | 1 | 0 | 1 | 0 | 0 |
| Q | 1 | 2 | 1 | 1 | 0 | 0 | 1 | 0 |
| Out-of-sample RMSE | 5.07 | 4.99 | 4.99 | 4.99 | 8.78 | 6.05 | 4.92 | 7.63 |

TABLE 11

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| λ | 0.26 | | −2.84 | −4.66 | | 0.07 |
| Intercept | 0 | 1 | 0 | 1 | 1 | 1 |
| p | 0 | ( ) | ( ) | 0 | (1 4 5) | (3 5) |
| d | 0 | 0 | 2 | 2 | 0 | 0 |
| q | 0 | (1 3 5) | (1) | 2 | ( ) | (1 6) |
| P | 0 | (1) | ( ) | 0 | (2 4) | (1 2) |
| D | 1 | 1 | 1 | 2 | 1 | 1 |

TABLE 11-continued

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| Q | 0 | (2) | ( ) | 0 | (2 3) | (1) |
| Out-of-sample RMSE | 5.17 | 4.92 | 2.71 | 1.62 | 4.97 | 4.93 |

TABLE 12

| In-sample | BoxCox | Subset model? | Intercept included? | Final Orders | Estimated BoxCox parameter | Out-of-sample RMSE |
|---|---|---|---|---|---|---|
| False | False | False | Yes | (4, 0, 3) (1, 1, 1) | | 5.07 |
| False | False | True | Yes | ((4 5), 1, (1 3))(( ), 1, (3)) | | 5.18 |
| False | True | False | Yes | (5, 0, 0) (3, 2 ,0) | −4.6621 | 12.24 |
| False | True | True | No | ((3 5), 2, (4))((1), 1, (1 2 3)) | −3.6133 | 1.11 |
| True | False | False | Yes | (1, 0, 0) (0, 1, 2) | | 5.00 |
| True | False | True | Yes | ((2), 0, (1 2 3))(( ), 1, (1 2)) | | 5.05 |
| True | True | False | Yes | (0, 1, 5) (0, 2, 1) | −4.5785 | NaN |
| True | True | True | No | ((1 4 6), 2, (2 4 5)) ((2 3), 1,(1 2)) | −3.636 | NaN |

Table 10 displays the results of the comparative study for general ARIMA models, in absence of Box-Cox transformation. As seen from results of the out-of-sample data (last row), all of the proposed approaches (DFO-S, DFO-M1, DFO-M2) outperform the auto-ARIMA and are comparable to SAS diagnose method. Further, all three (DFO-S, DFO-M1, and DFO-M2) proposed approaches have comparable performance (e.g., similar RMSE).

Table 11 displays the results of the comparative study for subset ARIMA models for the DFO-M1 and DFO-M2 methods, as well as including the Box-Cox transformation. For example, Table 11 shows results for DFO-M1 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T). Table 11 also shows results for DFO-M2 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T).

Out of the various combinations shown in Table 11, the best performance (with out-of-sample error of 1.62) is obtained by DFO-M2 when subset ARIMA model is not used but Box-Cox transformation is used. Further, both DFO-M1 and DFO-M2 perform better or comparable with the subset ARIMA models relative to the full ARIMA model (Table 10).

Table 12 displays the results of the comparative study for subset ARIMA models for the DFO-S method, as well as including the Box-Cox transformation. For example, Table 12 shows results for DFO-S when Box-Cox transformation is used (Box-Cox=True) and subset ARIMA model is not used (Subset=False), when Box-Cox transformation is not used (Box-Cox=False) and subset ARIMA model is used (Subset=True), when Box-Cox transformation is used (Box-Cox=True) and subset ARIMA model is used (Subset=True), and when Box-Cox transformation is not used (Box-Cox=False) and subset ARIMA model is not used (Subset=False). Table 12 also shows results for when the intercept parameter is used (Yes) and when the intercept parameter is not used (No). Table 12 also shows results for when the in-sample data is used for computing the objective function (in-sample=True) and when holdout data is used for computing the objective function (In-Sample=False). The results show that the best value (e.g., lowest value) of the out-of-sample data is received when holdout data is used for computing the objective function in a subset ARIMA model when the Box-Cox transformation is used and intercept is not used.

Figure 22:
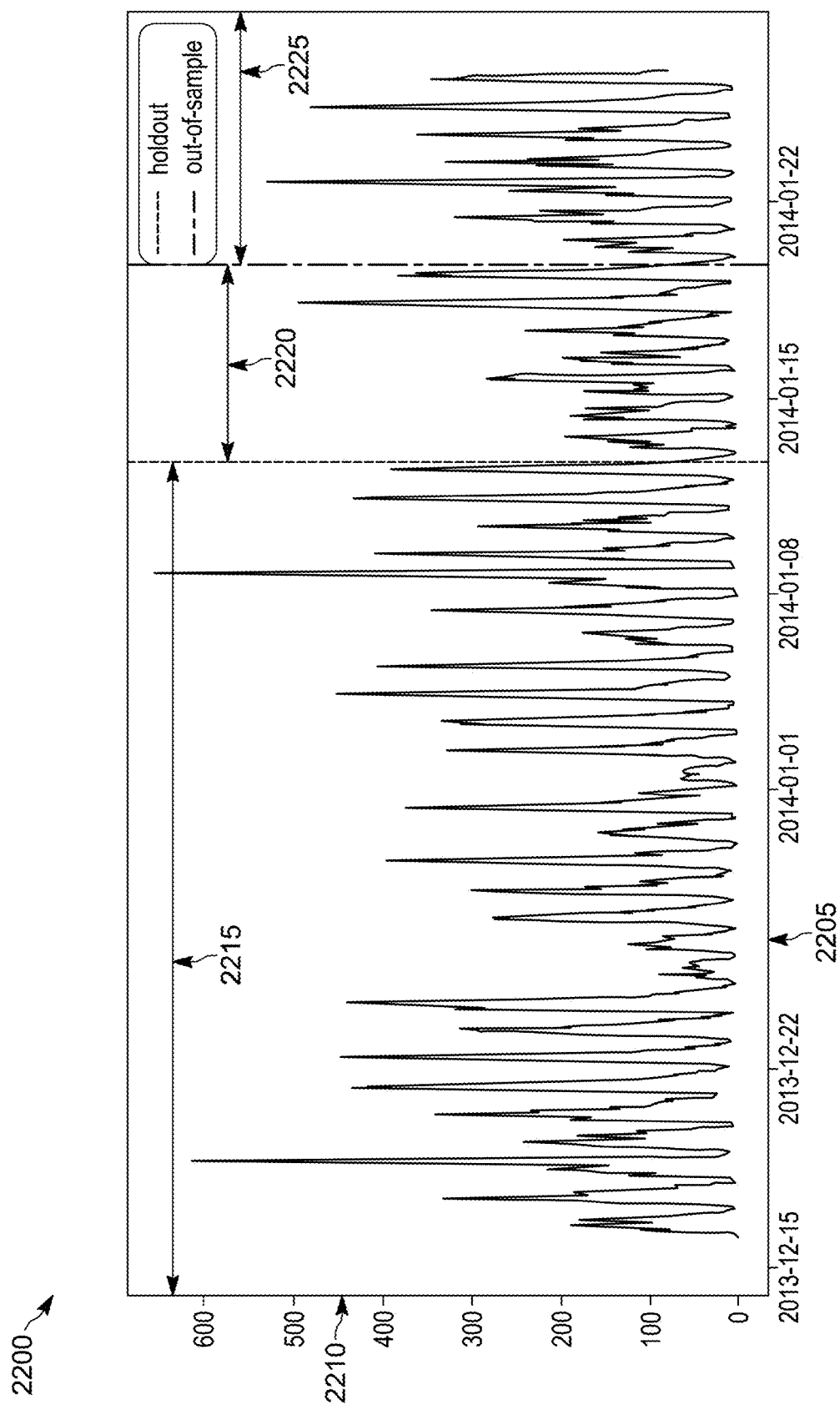
FIG. 22 is an example time series dataset for a fourth application, according to embodiments of the present technology.

Turning to FIG. 22, a graph 2200 shows time series data corresponding to hourly number of pedestrians captured by 66 sensors located in Melbourne city starting from Dec. 15, 2013 to Jan. 22, 2014 for a total length of 1000 time periods. Thus, the graph 2200 plots the timeline on X-axis 2205 against the number of pedestrians on Y-Axis 2210. The time series data on the graph 2200 is divided into in-sample data 2215, holdout data 2220, and out-of-sample data 2225. The out-of-sample data 2225 is predicted using the in-sample data 2215 and the holdout data 2220. The out-of-sample data 2225 corresponds to a predicted number of pedestrians forever 168 hours starting from Jan. 19, 2014 to Jan. 22, 2014. The in-sample data 2215 and the holdout data 2220 each is of length 168 hours (e.g., 168 time periods). The seasonality of the time series data shown in the graph 2200 is 24 (e.g., a day).

Tables 13-15 below show the comparative results of tuning the hyperparameters of the ARIMA model using the proposed approaches for the time series data shown in the graph 2200:

TABLE 12

| Parameter | DFO-S (Holdout) | DFO-S (In-samp) | DFO-M1 | DFO-M2 | auto-ARIMA (Holdout) | auto-ARIMA (In-samp) | SAS Diagnose (Holdout) | SAS Diagnose (In-samp) |
|---|---|---|---|---|---|---|---|---|
| Intercept | 0 | 0 | 0 | 0 | 0 | 0 | 0 | 0 |
| p | 0 | 9 | 7 | 4 | 0 | 4 | 2 | 2 |
| d | 0 | 0 | 0 | 0 | 0 | 0 | 0 | 0 |
| q | 0 | 8 | 9 | 3 | 1 | 1 | 4 | 4 |
| P | 3 | 3 | 3 | 3 | 3 | 3 | 2 | 2 |
| D | 0 | 0 | 0 | 0 | 0 | 0 | 1 | 1 |
| Q | 3 | 3 | 3 | 3 | 0 | 0 | 2 | 1 |
| Out-of-sample RMSE | 21.31 | 22.29 | 22.26 | 20.97 | 44.30 | 63.78 | 23.41 | 26.70 |

TABLE 14

| Parameter | DFO-M1 (BoxCox = T, Subset = F) | DFO-M1 (BoxCox = F, Subset = T) | DFO-M1 (BoxCox = T, Subset = T) | DFO-M2 (BoxCox = T, Subset = F) | DFO-M2 (BoxCox = F, Subset = T) | DFO-M2 (BoxCox = T, Subset = T) |
|---|---|---|---|---|---|---|
| λ | −4.74 | | −1.61 | −3.20 | | −5.00 |
| Intercept | 0 | 0 | 0 | 1 | 0 | 1 |
| p | 0 | ( ) | ( ) | 4 | ( ) | (1 2 3 4 5 6 7 8 9) |
| d | 0 | 0 | 2 | 3 | 0 | 3 |
| q | 0 | (3 6) | ( ) | 6 | (2 3 7 8) | (3 5 6 7) |
| P | 0 | (1 3) | ( ) | 2 | (1 2 3) | (3) |
| D | 2 | 1 | 1 | 0 | 1 | 0 |
| Q | 0 | (1 2 3) | ( ) | 1 | (1 2 3) | ( ) |
| Out-of-sample RMSE | 20.89 | 22.63 | 1.82 | 2.09 | 20.44 | 1.77 |

TABLE 15

| In-sample | BoxCox | Subset model? | Intercept included? | Final Orders | Estimated BoxCox parameter | Out-of-sample RMSE |
|---|---|---|---|---|---|---|
| False | False | False | No | (0, 0, 0)(3, 0, 3) | | 21.31 |
| False | False | True | No | ((3 4 5 6 7 8), 0, (3 5 8))((1 2), 1, (1 2 3)) | | 21.75 |
| False | True | False | No | (1, 3, 5)(2, 0, 3) | −2.4793 | 5.65 |
| False | True | True | Yes | ((2 3 5 7 8 9), 1, (1 4 5 7 8 9))(( ), 0, (3)) | −5.0 | 61.12 |
| True | False | False | No | (9, 0, 8)(3, 0, 3) | | 22.30 |
| True | False | True | Yes | ((1 2 3 4 5 6 7 8 9), 0, (1 3 4 7 8))((1 2 3), 0, (1 2 3)) | | 23.53 |
| True | True | False | Yes | (0, 0, 0)(0, 1, 0) | −5.0 | 3.59 |
| True | True | True | Yes | (( ), 3, ( ))(( ), 0, ( )) | −5.0 | NaN |

Table 13 displays the results of the comparative study for general ARIMA models, in absence of Box-Cox transformation. As seen from results of the out-of-sample data (last row), all of the proposed approaches (DFO-S. DFO-M1, DFO-M2) outperform the auto-ARIMA and SAS diagnose methods. Further, of the three (DFO-S, DFO-M1, and DFO-M2) proposed approaches. DFO-M2 performs better than DFO-S and DFO-M1.

Table 14 displays the results of the comparative study for subset ARIMA models for the DFO-M1 and DFO-M2 methods, as well as including the Box-Cox transformation. For example. Table 14 shows results for DFO-M1 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T). Table 14 also shows results for DFO-M2 when Box-Cox transformation is used (Box-Cox=T) and subset ARIMA model is not used (Subset=F), when Box-Cox transformation is not used (Box-Cox=F) and subset ARIMA model is used (Subset=T), and when Box-Cox transformation is used (Box-Cox=T) and subset ARIMA model is used (Subset=T).

The subset ARIMA models for both DFO-M1 and DFO-M2 perform better than the full ARIMA model (Table 13).

Further, out of the various combinations shown in Table 14, the best performance (with out-of-sample error of 1.77) is obtained by DFO-M2 when subset ARIMA model is used and Box-Cox transformation is also used.

Table 15 displays the results of the comparative study for subset ARIMA models for the DFO-S method, as well as including the Box-Cox transformation. For example, Table 15 shows results for DFO-S when Box-Cox transformation is used (Box-Cox=True) and subset ARIMA model is not used (Subset=False), when Box-Cox transformation is not used (Box-Cox=False) and subset ARIMA model is used (Subset=True), when Box-Cox transformation is used (Box-Cox=True) and subset ARIMA model is used (Subset=True), and when Box-Cox transformation is not used (Box-Cox=False) and subset ARIMA model is not used (Subset=False). Table 15 also shows results for when the intercept parameter is used (Yes) and when the intercept parameter is not used (No). Table 15 also shows results for when the in-sample data is used for computing the objective function (in-sample=True) and when holdout data is used for computing the objective function (In-Sample=False). The results show that the best value (e.g., lowest value) of the out-of-sample data is received when the in-sample data is used for computing the objective function in a full ARIMA model when the Box-Cox transformation is used and intercept is used.

Thus, the proposed approaches (DFO-S, DFO-M1, DFO-M2) provide several benefits over conventional mechanisms. The proposed approaches are able to handle both full and subset ARIMA models, as well as both seasonal and non-seasonal ARIMA models. The proposed approaches are also able to tune the Box-Cox hyperparameter as well as the presence or absence of the intercept hyperparameter simultaneously with the other hyperparameters of the ARIMA models. The proposed multi-objective methods prevent overfitting, resulting in increased model accuracy and parsimony. The MRV score in the multi-objective methods regulates how far the model residuals are from white noise. The proposed approaches are able to leverage parallel and distributed processing. As seen from Tables 3-15 above, the proposed approaches outperform the conventional approaches auto-ARIMA and SAS diagnose.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a first processor associated with a main machine and a second processor associated with each of a plurality of worker machines of a distributed computing system, cause the first processor and the second processor to:

receive, via a user interface associated with the distributed computing system, a time series dataset;

tune a set of hyperparameters for the time series dataset in a plurality of iterations, wherein the plurality of worker machines execute at least some of the plurality of iterations in parallel, and wherein to tune the set of hyperparameters, the computer-readable instructions further cause the first processor and the second processor to:

(A) determine, by each worker machine of the plurality of worker machines, an initial hyperparameter value for each hyperparameter in the set of hyperparameters to be tuned to generate a set of initial hyperparameter values for the time series dataset;

(B) fit, by each worker machine of the plurality of worker machines, an Auto-Regressive Integrated Moving Average (ARIMA) model to the set of initial hyperparameter values;

(C) receive selection, at the main machine or at each of the plurality of worker machines, of a tuning method for the set of hyperparameters via the user interface of the distributed computing system, wherein the tuning method comprises either a single-objective method or a multi-objective method;

(D) responsive to receiving selection of the single-objective method, compute, by each worker machine of the plurality of worker machines, a first objective function value from time-series data applied to the ARIMA model based on the set of initial hyperparameter values, or responsive to receiving selection of the multi-objective method, compute, by each worker machine of the plurality of worker machines, at least a second objective function value and a third objective function value from the time-series data applied to the ARIMA model based on the set of initial hyperparameter values, wherein to compute the third objective function value, the computer-readable instructions further cause each worker machine of the plurality of worker machines to compute a Model Residual Validity (MRV) score measuring how close an array of model residuals of the ARIMA model are to white noise, wherein the MRV score is computed as:

$MRV = (|U_{acf}| + |U_{pacf}| + |U_{wn}|)/3n$, where $U_{acf} = \{1 \leq i \leq n | ACF([i]) \geq tol_1 \times (\text{standard error of } ACF([i]))\}$, $U_{pacf} = \{1 \leq i \leq n | PACF([i]) \geq tol_2 \times (\text{standard error of } PACF([i]))\}$, $U_{wn} = \{1 \leq i \leq n | (WNP(i) \geq tol_3\}$, $tol_1$, $tol_2$, $tol_3$ are predetermined threshold values, n is the number of lags, ACF is an auto-correlation function of $\varepsilon$, PACF is a partial auto-correlation function of $\varepsilon$; WNP is a white noise probability function of $\varepsilon$, and $\varepsilon$ are model residuals;

(E) send, by each worker machine of the plurality of worker machines, the computed first objective function value for the single-objective method or the at least the second objective function value and the third objective function value for the multi-objective method to the main machine;

(F) determine, at the main machine, whether a stopping criterion for tuning the set of hyperparameters has reached; and (G) responsive to determining, at the main machine, that the stopping criterion has not reached, send instructions by the main machine to each worker machine of the plurality of worker machines to update the initial hyperparameter value for each hyperparameter in the set of hyperparameters to an updated hyperparameter value to generate a set of updated hyperparameter values, and repeat (B) to (G) with the set of updated hyperparameter values instead of the set of initial hyperparameter values, or responsive to determining that the stopping criteria has reached, determine, by the main machine, a set of tuned hyperparameter values comprising a tuned hyperparameter value for each hyperparameter in the set of hyperparameters, wherein:

responsive to determining that the single-objective method is received in (C), the main machine compares the first objective function value of each hyperparameter of the set of hyperparameters from each of the plurality of iterations and selects a lowest value of the first objective function value as the tuned hyperparameter value for that hyperparameter, or responsive to determining that the multi-objective method is received in (C), the main machine determines the tuned hyperparameter value of each hyperparameter of the set of hyperparameters based on either the second objective function value or the third objective function value from the plurality of iterations; and display the set of tuned hyperparameter values on the user interface associated with the distributed computing system.

2. The non-transitory computer-readable medium of claim 1, wherein to generate the set of initial hyperparameter values, the computer-readable instructions further cause at least one of the first processor or the second processor to:

receive a value range of each hyperparameter in the set of hyperparameters; and select a value from the value range of each hyperparameter as the initial hyperparameter value for that hyperparameter.

3. The non-transitory computer-readable medium of claim 2, wherein to generate the set of updated hyperparameter values, the computer-readable instructions further cause at least one of the first processor or the second processor to select another value from the value range of each hyperparameter as the updated hyperparameter value for that hyperparameter.

4. The non-transitory computer-readable medium of claim 1, wherein the ARIMA model comprises a full ARIMA model.

5. The non-transitory computer-readable medium of claim 1, wherein the ARIMA model comprises a subset ARIMA model.

6. The non-transitory computer-readable medium of claim 1, wherein to compute the first objective function value, the computer-readable instructions further cause the second processor to:

compute a first function value from in-sample data selected from the time-series data; or compute a second function value from holdout data selected from the time-series data.

7. The non-transitory computer-readable medium of claim 6, wherein the first function value comprises an Akaike's information criterion (AICc) value, and wherein the second function value comprises a root mean square error value.

8. The non-transitory computer-readable medium of claim 1, wherein:
the multi-objective method comprises a first multi-objective method or a second multi-objective method;
each of the first multi-objective method and the second multi-objective method comprises the second objective function value, the third objective function value, and a fourth objective function value;
to compute the second objective function value, the computer-readable instructions further cause the second processor to compute a first function value on holdout data selected from the time-series data; and
the set of updated hyperparameter values that are output as the set of tuned hyperparameter values are based on either the second objective function value, the third objective function value, or the fourth objective function value.

9. The non-transitory computer-readable medium of claim 8, wherein to compute the fourth objective function value for the second multi-objective method, the computer-readable instructions further cause the second processor to compute a second function value from in-sample data selected from the time-series data.

10. The non-transitory computer-readable medium of claim 9, wherein the first function value comprises a root mean square error value and the second function value comprises an Akaike's information criterion (AICc) value.

11. The non-transitory computer-readable medium of claim 8, wherein:
to compute the fourth objective function value for the first multi-objective method, the computer-readable instructions further cause the second processor to compute a complexity value indicating a number of hyperparameters in the set of hyperparameters to estimate for the ARIMA model;
the complexity value for a full ARIMA model is computed as p+q+P+Q, where p is a non-seasonal autoregressive order, q is a non-seasonal moving average order, P is a seasonal autoregressive order, Q is a seasonal moving average order; and the complexity value for a subset ARIMA model is computed as $|S_p|+|S_q|+|S_P|+|S_Q|$, where $S_p$, $S_P$, $S_q$, and $S_Q$ are cardinalities of subsets of non-seasonal AR orders, seasonal AR orders, non-seasonal MA orders, and seasonal MA models, respectively, in the subset ARIMA model.

12. The non-transitory computer-readable medium of claim 8, wherein to output the set of updated hyperparameter values as the set of tuned hyperparameter values based on either the second objective function value, the third objective function value, or the fourth objective function value, the computer-readable instructions further cause at least one of the first processor or the second processor to:
generate a set of Pareto front outputs based on the second objective function value, the third objective function value, and the fourth objective function value;
compute a third function value from out-of-sample data in the time-series data for each Pareto front output in the set of Pareto front outputs; and
select the set of updated hyperparameter values corresponding to the Pareto front output having an optimal value of the third function value as the set of tuned hyperparameter values.

13. The non-transitory computer-readable medium of claim 12, wherein the optimal value comprises either a highest value of the third function value or a lowest value of the third function value.

14. The non-transitory computer-readable medium of claim 12, wherein the third function value comprises a root mean square error value.

15. The non-transitory computer-readable medium of claim 1, wherein the computer-readable instructions further cause at least one of the first processor or the second processor to predict a future data point in the time-series data by applying the set of tuned hyperparameter values to the ARIMA model.

16. The non-transitory computer-readable medium of claim 1, wherein the plurality of iterations comprises one or more computing sessions.

17. A system comprising:
a memory having computer-readable instructions stored thereon; and
a first processor associated with a main machine and a second processor associated with each of a plurality of worker machines of a distributed computing system that execute the computer-readable instructions to:
receive, via a user interface associated with the distributed computing system, a time series dataset;
tune a set of hyperparameters for the time series dataset in a plurality of iterations, wherein the plurality of worker machines execute at least some of the plurality of iterations in parallel, and wherein to tune the set of hyperparameters, the computer-readable instructions further cause the first processor and the second processor to:
(A) determine, by each worker machine of the plurality of worker machines, an initial hyperparameter value for each hyperparameter in the set of hyperparameters to be tuned to generate a set of initial hyperparameter values for the time series dataset;
(B) fit, by each worker machine of the plurality of worker machines, an Auto-Regressive Integrated Moving Average (ARIMA) model to the set of initial hyperparameter values;
(C) receive selection, at the main machine or at each of the plurality of worker machines, of a tuning method for the set of hyperparameters via the user interface of the distributed computing system, wherein the tuning method comprises either a single-objective method or a multi-objective method;
(D) responsive to receiving selection of the single-objective method, compute, by each worker machine of the plurality of worker machines, a first objective function value from time-series data applied to the ARIMA model based on the set of initial hyperparameter values, or responsive to receiving selection of the multi-objective method, compute, by each worker machine of the plurality of worker machines, at least a second objective function value and a third objective function value from the time-series data applied to the ARIMA model based on the set of initial hyperparameter values, wherein to compute the third objective function value, the computer-readable instructions further cause each worker machine of the plurality of worker machines to compute a Model Residual Validity (MRV) score measuring how close an array of model residuals of the ARIMA model are to white noise, wherein the MRV score is computed as:

MRV=($|U_{acf}|+|U_{pacf}|+|U_{wn}|$)/3n, where $U_{acf}$={1≤i≤n|ACF([i])≥$tol_1$×(standard error of ACF ([i]))}, $U_{pacf}$={1≤i≤n|PACF([i])≥$tol_2$×(standard error of PACF([i]))}, $U_{wn}$={1≤i≤n|(WNP(i)≥$tol_3$}, $tol_1$, $tol_2$, $tol_3$ are predetermined threshold values, n is the number of lags, ACF is an auto-correlation function of ε, PACF is a partial auto-correlation function of ε; WNP is a white noise probability function of ε, and a are model residuals;

(E) send, by each worker machine of the plurality of worker machines, the computed first objective function value for the single-objective method or the at least the second objective function value and the third objective function value for the multi-objective method to the main machine:

(F) determine, at the main machine, whether a stopping criterion for tuning the set of hyperparameters has reached; and (G) responsive to determining, at the main machine, that the stopping criterion has not reached, send instructions by the main machine to each worker machine of the plurality of worker machines to update the initial hyperparameter value for each hyperparameter in the set of hyperparameters to an updated hyperparameter value to generate a set of updated hyperparameter values, and repeat (B) to (G) with the set of updated hyperparameter values instead of the set of initial hyperparameter values, or responsive to determining that the stopping criteria has reached, determine, by the main machine, a set of tuned hyperparameter values comprising a tuned hyperparameter value for each hyperparameter in the set of hyperparameters, wherein:

responsive to determining that the single-objective method is received in (C), the main machine compares the first objective function value of each hyperparameter of the set of hyperparameters from each of the plurality of iterations and selects a lowest value of the first objective function value as the tuned hyperparameter value for that hyperparameter, or responsive to determining that the multi-objective method is received in (C), the main machine determines the tuned hyperparameter value of each hyperparameter of the set of hyperparameters based on either the second objective function value or the third objective function value from the plurality of iterations; and display the set of tuned hyperparameter values on the user interface associated with the distributed computing system.

18. The system of claim 17, wherein to generate the set of initial hyperparameter values, the computer-readable instructions further cause at least one of the first processor or the second processor to:

receive a value range of each hyperparameter in the set of hyperparameters; and select a value from the value range of each hyperparameter as the initial hyperparameter value for that hyperparameter.

19. The system of claim 18, wherein to generate the set of updated hyperparameter values, the computer-readable instructions further cause the at least one of the first processor or the second processor to select another value from the value range of each hyperparameter as the updated hyperparameter value for that hyperparameter.

20. The system of claim 17, wherein the ARIMA model comprises a full ARIMA model or a subset ARIMA model.

21. The system of claim 17, wherein to compute the first objective function value, the computer-readable instructions further cause the second processor to:

compute a first function value from in-sample data selected from the time-series data; or compute a second function value from holdout data selected from the time-series data.

22. The system of claim 21, wherein the first function value comprises an Akaike's information criterion (AICc) value, and wherein the second function value comprises a root mean square error value.

23. The system of claim 17, wherein:

the multi-objective method comprises a first multi-objective method or a second multi-objective method;

each of the first multi-objective method and the second multi-objective method comprises the second objective function value, the third objective function value, and a fourth objective function value;

to compute the second objective function value, the computer-readable instructions further cause the second processor to compute a root mean square error value on holdout data selected from the time-series data;

to compute the fourth objective function value for the second multi-objective method, the computer-readable instructions further cause the second processor to compute an Akaike's information criterion (AICc) value from in-sample data selected from the time-series data or to compute the fourth objective function value for the first multi-objective method, the computer-readable instructions further cause the second processor to compute a complexity value indicating a number of hyperparameters in the set of hyperparameters to estimate for the ARIMA model, wherein the complexity value for a full ARIMA model is computed as p+q+P+Q, where p is a non-seasonal autoregressive order, q is a non-seasonal moving average order, P is a seasonal autoregressive order, Q is a seasonal moving average order, and wherein the complexity value for a subset ARIMA model is computed as $|S_p|+|S_q|+|S_P|+|S_Q|$, where $S_p$, $S_P$, $S_q$, and $S_Q$ are cardinalities of subsets of non-seasonal AR orders, seasonal AR orders, non-seasonal MA orders, and seasonal MA models, respectively, in the subset ARIMA model; and the set of updated hyperparameter values that are output as the set of tuned hyperparameter values are based on either the second objective function value, the third objective function value, or the fourth objective function value.

24. The system of claim 23, wherein to output the set of updated hyperparameter values as the set of tuned hyperparameter values based on either the second objective function value, the third objective function value, or the fourth objective function value, the computer-readable instructions further cause at least one of the first processor or the second processor to:

generate a set of Pareto front outputs based on the second objective function value, the third objective function value, and the fourth objective function value;

compute a third function value from out-of-sample data in the time-series data for each Pareto front output in the set of Pareto front outputs; and select the set of updated hyperparameter values corresponding to the Pareto front output having an optimal value of the third function value as the set of tuned hyperparameter values, wherein the optimal value comprises either a highest value of the third function value or a lowest value of the third function value; and wherein the third function value comprises a root mean square error value.

25. The system of claim 17, wherein the computer-readable instructions further cause at least one of the first processor or the second processor to predict a future data point in the time-series data by applying the set of tuned hyperparameter values to the ARIMA model.

26. The system of claim 17, wherein the plurality of iterations comprises one or more computing sessions.

27. A method comprising:

receiving, via a user interface associated with a distributed computing system having a first processor associated with a main machine and a second processor associated with each of a plurality of worker machines, a time series dataset;

tuning, by the first processor and the second processor executing computer-readable instructions stored on a memory, a set of hyperparameters for the time series dataset in a plurality of iterations, wherein the plurality of worker machines execute at least some of the plurality of iterations in parallel, and wherein to tune the set of hyperparameters, the computer-readable instructions further cause the first processor and the second processor to:

(A) determine, by each worker machine of the plurality of worker machines, an initial hyperparameter value for each hyperparameter in the set of hyperparameters to be tuned to generate a set of initial hyperparameter values for the time series dataset;

(B) fit, by each worker machine of the plurality of worker machines, an Auto-Regressive Integrated Moving Average (ARIMA) model to the set of initial hyperparameter values;

(C) receive, at the main machine or at each of the plurality of worker machines, selection of a tuning method for the set of hyperparameters via the user interface of the distributed computing system, wherein the tuning method comprises either a single-objective method or a multi-objective method;

(D) responsive to receiving selection of the single-objective method, compute, by each worker machine of the plurality of worker machines, a first objective function value from time-series data applied to the ARIMA model based on the set of initial hyperparameter values, or responsive to receiving selection of the multi-objective method, compute, by each worker machine of the plurality of worker machines, at least a second objective function value and a third objective function value from the time-series data applied to the ARIMA model based on the set of initial hyperparameter values, wherein to compute the third objective function value, the computer-readable instructions further cause each worker machine of the plurality of worker machines to compute a Model Residual Validity (MRV) score measuring how close an array of model residuals of the ARIMA model are to white noise, wherein the MRV score is computed as:

MRV=$(|U_{acf}|+|U_{pacf}|+|U_{wn}|)/3n$, where $U_{acf}=\{1 \le i \le n | ACF([i]) \ge tol_1 \times$(standard error of ACF$([i]))\}$, $U_{pacf}=\{1 \le i \le n | PACF([i]) \ge tol_2 \times$(standard error of PACF$([i]))\}$, $U_{wn}=\{1 \le i \le n | (WNP(i) \ge tol_3\}$, $tol_1$, $tol_2$, $tol_3$ are predetermined threshold values, n is the number of lags, ACF is an auto-correlation function of $\varepsilon$, PACF is a partial auto-correlation function of $\varepsilon$; WNP is a white noise probability function of $\varepsilon$, and a are model residuals;

(E) send, by each worker machine of the plurality of worker machines, the computed first objective function value for the single-objective method or the at least the second objective function value and the third objective function value for the multi-objective method to the main machine;

(F) determine, at the main machine, whether a stopping criterion for tuning the set of hyperparameters has reached; and (G) responsive to determining, at the main machine, that the stopping criterion has not reached, send instructions by the main machine to each worker machine of the plurality of worker machines for updating the initial hyperparameter value for each hyperparameter in the set of hyperparameters to an updated hyperparameter value to generate a set of updated hyperparameter values, and repeat, by the processor, (B) to (G) with the set of updated hyperparameter values instead of the set of initial hyperparameter values, or responsive to determining that the stopping criteria has reached, determine, by the main machine, a set of tuned hyperparameter values comprising a tuned hyperparameter value for each hyperparameter in the set of hyperparameters, wherein:

responsive to determining that the single-objective method is received in (C), compare, by the main machine, the first objective function value of each hyperparameter of the set of hyperparameters from each of the plurality of iterations and select a lowest value of the first objective function value as the tuned hyperparameter value for that hyperparameter, or responsive to determining that the multi-objective method is received in (C), determine, by the main machine, the tuned hyperparameter value of each hyperparameter of the set of hyperparameters based on either the second objective function value or the third objective function value from the plurality of iterations; and display the set of tuned hyperparameter values on the user interface associated with the distributed computing system.

28. The method of claim 27, further comprising predicting, by at least one of the first processor or the second processor, a future data point in the time-series data by applying the set of tuned hyperparameter values to the ARIMA model.

29. The method of claim 27, wherein the multi-objective method comprises a first multi-objective method or a second multi-objective method, wherein each of the first multi-objective method and the second multi-objective method comprises the second objective function value, the third objective function value, and a fourth objective function value, and wherein the method further comprises:

computing, by the second processor, a root mean square error value on holdout data selected from the time-series data for computing the second objective function value;

computing, by the second processor, an Akaike's information criterion (AICc) value from in-sample data selected from the time-series data for computing the fourth objective function value for the second multi-objective method or computing, by the second processor, a complexity value indicating a number of hyperparameters in the set of hyperparameters to estimate for the ARIMA model for computing the fourth objective function value for the first multi-objective method, wherein the complexity value for a full ARIMA model is computed as p+q+P+Q, where p is a non-seasonal autoregressive order, q is a non-seasonal moving average order, P is a seasonal autoregressive order, Q is a seasonal moving average order, and wherein the complexity value for a subset ARIMA model is computed as $|S_p|+|S_q|+|S_P|+|S_Q|$, where $S_p$, $S_P$, $S_q$, and $S_Q$ are cardinalities of subsets of non-seasonal AR orders, seasonal AR orders, non-seasonal MA orders, and seasonal MA models, respectively, in the subset ARIMA model;

generating, by at least one of the first processor or the second processor, a set of Pareto front outputs based on the second objective function value, the third objective function value, and the fourth objective function value;

computing, by at least one of the first processor or the second processor, a third function value from out-of-sample data in the time-series data for each Pareto front output in the set of Pareto front outputs; and selecting, by at least one of the first processor or the second processor, the set of updated hyperparameter values corresponding to the Pareto front output having an optimal value of the third function value as the set of tuned hyperparameter values, wherein the optimal value comprises either a highest value of the third function value or a lowest value of the third function value; and wherein the third function value comprises a root mean square error value.

30. The method of claim 27, wherein for computing the first objective function value, the method further comprises:

computing, by the second processor, a first function value from in-sample data selected from the time-series data; or computing, by the second processor, a second function value from holdout data selected from the time-series data, wherein the first function value comprises an Akaike's information criterion (AICc) value, and wherein the second function value comprises a root mean square error value.

* * * * *

UNITED STATES PATENT AND TRADEMARK OFFICE
CERTIFICATE OF CORRECTION

PATENT NO. : 12,380,369 B1
APPLICATION NO. : 18/984272
DATED : August 5, 2025
INVENTOR(S) : Mahesh V. Joshi et al.

It is certified that error appears in the above-identified patent and that said Letters Patent is hereby corrected as shown below:

In the Specification

Column 42, Line 46:
Delete the phrase "S ⊆ R+" and replace with --S ⊆ $R^+$--.

Column 42, Line 47:
Delete the phrase "$y \in S$" and replace with --$y \in S$--.

Column 43, Equation 3:
Delete the phrase "$(1 - B^S) X_t$" and replace with --$(1 - B^S)^D X_t$--.

Column 44, Line 60:
Delete the phrase "$S_p$, $S_q$, and $S_Q$" and replace with --$S_P$, $S_q$, and $S_Q$--.

Column 44, Line 64:
Delete the phrase "Et" and replace with --$\epsilon_t$--.

Column 45, Line 16 (Table 2, Line 6):
Delete the phrase "$iS_p$" and replace with --$iS_P$--.

Column 45, Line 36:
Delete the phrase "P[Q]" and replace with --P[P]--.

Column 48, Line 30:
Delete the phrase "$SSE = \sum_{f=1}^{n} (y_t - \hat{y}_t)^2$," and replace with --$SSE = \sum_{t=1}^{n} (y_t - \hat{y}_t)^2$--.

Column 48, Line 34:
Delete the phrase "t is the predicted value." and replace with --$\hat{y}_t$ is the predicted value.--.
Column 49, Line 51:

Signed and Sealed this
Sixteenth Day of September, 2025

Coke Morgan Stewart
*Acting Director of the United States Patent and Trademark Office*

Delete the phrase "$\hat{y}t$" and replace with --$\hat{y}_t$--.

Column 49, Line 59:
Delete the phrase "MRV = (Uacf | + |Upacf | + |Uwn|) / 3n" and replace with
--MRV = (|Uacf | + |Upacf | + |Uwn|) /(3n)--.

Column 50, Line 1:
Delete the phrase "|Uacf|" and replace with --|U$_{acf}$|--.

Column 50, Line 2:
Delete the phrase "|Upacf|" and replace with --|U$_{pacf}$|--.

Column 50, Line 4:
Delete the phrase "|Uwn|" and replace with --|U$_{wn}$|--.

Column 50, Line 56:
Delete the phrase "|S$_p$| + S$_q$| + |S$_P$| + |S$_Q$|" and replace with --|S$_p$| + |S$_q$| + |S$_P$| + |S$_Q$|--.

Column 54, Line 19:
Delete the phrase "$f_i(x) > f_j(y)$" and replace with --$f_j(x) > f_j(y)$--.

In the Claims

Claim 1, Column 69, Line 56:
Delete the phrase "MRV = (|U$_{acf}$| + |U$_{pacf}$| + |U$_{wn}$|) / 3n," and replace with
--MRV = (|U$_{acf}$| + |U$_{pacf}$| + |U$_{wn}$|) / (3n),--.

Claim 1, Column 69, Line 57:
Delete the phrase "ACF([i]) ≥ tol$_1$ × (standard error of ACF([i]))}," and replace with
--ACF(i) ≥ tol$_1$ × (standard error of ACF(i))},--.

Claim 1, Column 69, Lines 58-59:
Delete the phrase "PACF([i]) ≥ tol$_2$ × (standard error of PACF([i]))}," and replace with
--PACF(i) ≥ tol$_2$ × (standard error of PACF(i))},--.

Claim 17, Column 73, Line 7:
Delete the phrase "MRV = (|U$_{acf}$| + |U$_{pacf}$| + |U$_{wn}$|) / 3n," and replace with
--MRV = (|U$_{acf}$| + |U$_{pacf}$| + |U$_{wn}$|) / (3n),--.

Claim 17, Column 73, Line 8:
Delete the phrase "ACF([i]) ≥ tol$_1$" and replace with --ACF(i) ≥ tol$_1$--.

Claim 17, Column 73, Line 9:
Delete the phrase "ACF([i]))}, U$_{pacf}$ = {1 ≤ i ≤ n | PACF([i]) ≥ tol$_2$" and replace with
--ACF(i))}, U$_{pacf}$ = {1 ≤ i ≤ n | PACF(i) ≥ tol$_2$--.
Claim 17, Column 73, Line 10:

CERTIFICATE OF CORRECTION (continued)
U.S. Pat. No. 12,380,369 B1

Delete the phrase "PACF([i]))}," and replace with --PACF(i))},--.